(12) United States Patent
Wifvesson et al.

(10) Patent No.: US 11,665,206 B2
(45) Date of Patent: *May 30, 2023

(54) METHODS PROVIDING MANAGEMENT OF EMERGENCY SESSIONS AND RELATED DEVICES AND NODES

(71) Applicant: TELEFONAKTIEBOLAGET LM ERICSSON (PUBL), Stockholm (SE)

(72) Inventors: Monica Wifvesson, Lund (SE); Prajwol Kumar Nakarmi, Sollentuna (SE); Noamen Ben Henda, Vällingby (SE); Håkan Palm, Växjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 24 days.

This patent is subject to a terminal disclaimer.

(21) Appl. No.: 17/404,074

(22) Filed: Aug. 17, 2021

(65) Prior Publication Data
US 2021/0377316 A1 Dec. 2, 2021

Related U.S. Application Data

(63) Continuation of application No. 17/165,655, filed on Feb. 2, 2021, now Pat. No. 11,128,671, which is a (Continued)

(51) Int. Cl.
*H04L 9/40* (2022.01)
*H04W 4/90* (2018.01)
(Continued)

(52) U.S. Cl.
CPC ............ *H04L 63/205* (2013.01); *H04L 67/14* (2013.01); *H04W 4/90* (2018.02); *H04W 12/10* (2013.01); *H04W 76/50* (2018.02)

(58) Field of Classification Search
CPC ....... H04L 63/205; H04L 67/14; H04L 29/06; H04W 4/90; H04W 76/50; H04W 12/10; H04W 12/00
See application file for complete search history.

(56) References Cited

U.S. PATENT DOCUMENTS

| 2016/0360357 A1 | 12/2016 | Zhu et al. |
| 2018/0062847 A1 | 1/2018 | Mildh et al. |

(Continued)

FOREIGN PATENT DOCUMENTS

| CN | 109218325 A | 1/2019 |
| CN | 109246705 A | 1/2019 |

OTHER PUBLICATIONS

Huawei et al., "Algorithm Negotiation for Unauthenticated UEs in LSM", 3GPP TSG-SA WG3 Meeting #92, S3-182646, Dalian (China), Aug. 20-24, 2018. (Year: 2018).*

(Continued)

*Primary Examiner* — Umair Ahsan

(57) ABSTRACT

A method is provided to operate a CN node to determine UP security activation. A UP session establishment request is obtained for a wireless device. An indication is obtained that the UP session establishment request is associated with an emergency session and/or that null ciphering and/or null integrity protection are applied to a CP associated with a CP session for the wireless device. It is determined that a UP should be configured for the UP session without activating integrity and/or confidentiality protection for the UP based on the indication. A UP security policy is provided to a RAN node associated with the wireless device, wherein the UP security policy indicates to configure the UP for the UP session without activating integrity and/or confidentiality protection based on determining that a UP should be configured for the UP session without activating integrity and/or confidentiality protection.

21 Claims, 15 Drawing Sheets

Related U.S. Application Data continuation of application No. PCT/EP2020/054745, filed on Feb. 24, 2020.

(60) Provisional application No. 62/811,649, filed on Feb. 28, 2019.

(51) Int. Cl.
*H04W 76/50* (2018.01)
*H04L 67/14* (2022.01)
*H04W 12/10* (2021.01)

(56) References Cited

U.S. PATENT DOCUMENTS

2019/0068625 A1* 2/2019 Alfano .................. H04L 43/062
2020/0037165 A1* 1/2020 Kunz ..................... H04W 12/37

OTHER PUBLICATIONS

3GPP TS 23.502 V15.4.1, 3rd Generation Partnership Project; Technical Specification Group Services and System Aspects; Procedures for the 5G System; Stage 2 (Release 15), Jan. 2019. (Year: 2019).*

3GPP TS 23.501, V15.4.0, "3rd Generation Partnership Project; Technical Specification Group Services and System Aspects; System Architecture for the 5G System; Stage 2 (Release 15)", Dec. 2018.

3GPP TS 23.502 V15.4.1, 3rd Generation Partnership Project; Technical Specification Group Services and System Aspects; Procedures for the 5G System; Stage 2 (Release 15), Jan. 2019.

3GPP TS 33.501 V15.3.0, 3rd Generation Partnership Project; Technical Specification Group Services and System Aspects; Security architecture and procedures for 5G system (Release 15), Dec. 2018.

3GPP TS 33.501 V15.3.1, 3rd Generation Partnership Project; Technical Specification Group Services and System Aspects; Security architecture and procedures for 5G system (Release 15), Dec. 2018.

Huawei et al., "Algorithm Negotiation for Unauthenticated UEs in LSM", 3GPP TSG-SA WG3 Meeting #92, S3-182646, Dalian (China), Aug. 20-24, 2018.

ZTE, "Further Discussion and 38.413 pCR on PDU Session Security Policy Download", 3GPP TSG RAN WG3#99bis, R3-181688, Sanya, China, Apr. 16-20, 2018.

* cited by examiner

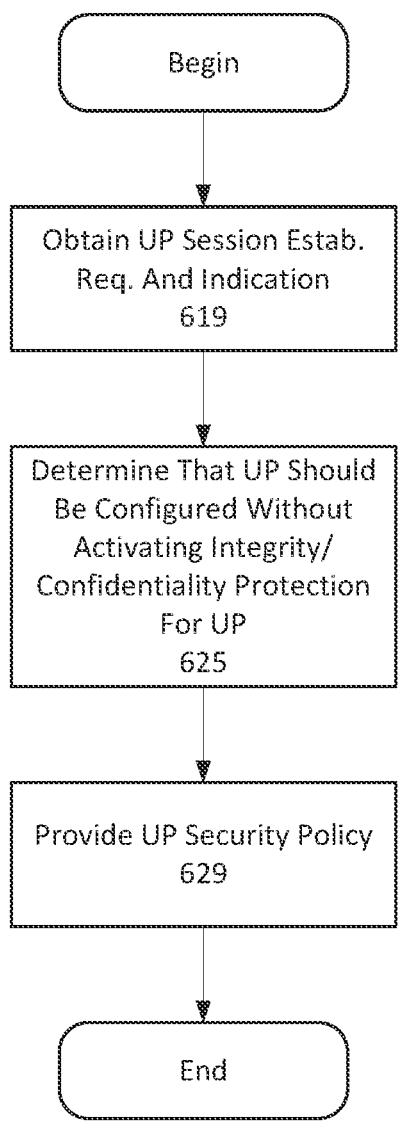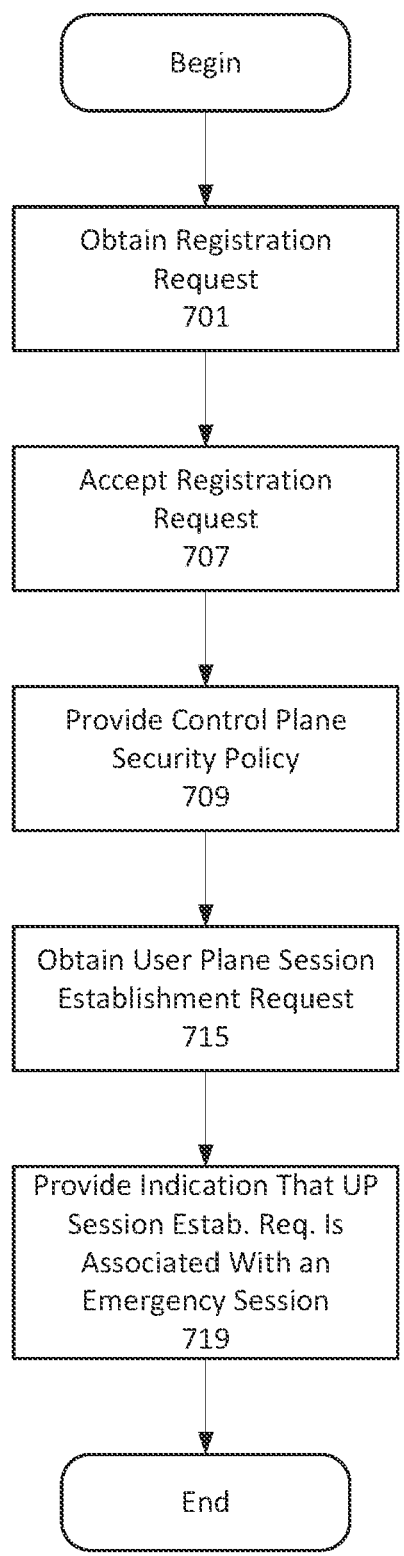

RAN Node Operations

METHODS PROVIDING MANAGEMENT OF EMERGENCY SESSIONS AND RELATED DEVICES AND NODES

RELATED APPLICATIONS

This application is a continuation of U.S. patent application Ser. No. 17/165,655, filed Feb. 2, 2021, which is a continuation of International Patent Application No. PCT/EP2020/054745, filed Feb. 24, 2020, which in turn claims priority to U.S. Provisional Application No. 62/811,649, filed Feb. 28, 2019. The disclosures of each of these references are incorporated in their entireties by reference herein.

TECHNICAL FIELD

The present disclosure relates generally to communications, and more particularly to communication methods and related devices and nodes supporting wireless communications.

BACKGROUND

The 3GPP TS 23.501 (Reference [2]) describes the 5G network architecture. A stripped down simplified version of a 5G network is shown in FIG. 1.

The UE (User Equipment) is a mobile device used by the user to wirelessly access the network. The radio access network (RAN) function or base station called gNB (Next Generation Node B) is responsible for providing wireless radio communication to the UE and connecting the UE to the core network CN. The core network function called AMF (Access and Mobility Management Function) is responsible for handling the mobility of the UE, among other responsibilities. Another core network function called SMF (Session Management Function) is responsible for handling the session and traffic steering of the UE, among other responsibilities. Yet another core network function called UPF (User Plane Function) is responsible for interconnecting to a data network, packet routing and forwarding, among other responsibilities.

The RAN in 5G (called NG-RAN) has another type of base station called ng-eNB. However, this document will talk in terms of gNB without the loss of generality.

As shown in FIG. 1, the UE interacts with the gNB over-the-air using a radio interface. The radio interface traffic may include both control plane CP traffic and user plane UP traffic. The radio control plane is also called RRC (Radio Resource Control). The gNB in turn interacts with the AMF using the interface called the N2. The interface between the AMF and the SMF is called the N11 interface. Similarly, the gNB and the UPF interact using the interface called the N3 interface. There is no direct interface between the gNB and the SMF, therefore, they interact via the AMF.

FIG. 1 is a simplified block diagram illustrating elements of a 5G network.

The logical aspects between the UE and the AMF is referred to as NAS (non-access stratum) and that between the UE and the gNB is referred to as AS (access stratum). Correspondingly, the security of communication (control plane and user plane, if applicable) is referred to as NAS security and AS security, respectively. The AS security includes confidentiality and integrity protection of both the control plane (i.e., the RRC, Radio Resource Control) and the user plane traffic. The AS security will be further discussed. The radio bearers in AS that carry control plane or RRC messages are called signaling radio bearers (SRBs). Similarly, the radio bearers in AS that carry user plane messages are called data radio bearers (DRBs).

In LTE (Long Term Evolution, which is popularly known as 4G) systems, the AS security is mandatory for both the RRC and the user plane. This means that both confidentiality and integrity protection are activated for the RRC and confidentiality is activated for the user plane. There is no support for integrity protection of the user plane in LTE. There are null-encryption and null-integrity algorithms in LTE which do not encrypt and integrity protect the RRC or user plane traffic in practice. But these null algorithms are just another kind of algorithm and therefore the AS security is still said to be activated, i.e., activated using null algorithms.

In a 5G system, the AS security is mandatory for the RRC but it is optional for the user plane. This means that that both confidentiality and the integrity protection will be activated for RRC, however, the confidentiality and the integrity protection are optional for the user plane.

In 5G systems, Emergency Services are provided to support IMS (IP Multimedia Subsystem) emergency sessions according to TS 23.501 [2]. "Emergency Services" refers to functionalities provided by the serving network when the network is configured to support Emergency Services. Emergency Services are provided to normally registered UEs and, depending on local regulation, to Emergency Registered UEs (hence in limited service state). Receiving Emergency Services in limited service state does not require a valid subscription. Depending on local regulation and on an operator's policy, the network may allow or reject a registration request for Emergency Services (i.e. Emergency Registration) from UEs that have been identified to be in limited service state.

In 5G, UEs that are in limited service mode (LSM) and/or that cannot be authenticated by the AMF/SEAF (for whatever reason) may still be allowed to establish emergency session by sending the emergency registration request message. The 5G system allows configuration for AMF/SEAF based on whether the AMF/SEAF allows unauthenticated UEs in LSM to establish bearers for emergency session or not.

In access stratum, SRBs and DRBs might need to be un-ciphered and non-integrity protected if the UE is in limited service mode (LSM) and/or if the UE cannot be authenticated by AMF/SEAF, as in this case no security can be established between the UE and the network.

SUMMARY

According to some embodiments of inventive concepts, a method is provided to operate a core network node in a wireless communication system to determine user plane security activation. A user plane session establishment request is obtained for a wireless device. An indication is obtained that the user plane session establishment request for the wireless device is associated with an emergency session and/or that null ciphering and/or null integrity protection are applied to a control plane associated with a control plane session for the wireless device. A determination is made that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session. A user plane security policy is provided to a radio access network RAN node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

According to some other embodiments of inventive concepts, a core network CN node is configured to operate in a wireless communication network. The CN node is adapted to perform the following operations. A user plane session establishment request is obtained for a wireless device. An indication is obtained that the user plane session establishment request for the wireless device is associated with an emergency session and/or that null ciphering and/or null integrity protection are applied to a control plane associated with a control plane session for the wireless device. A determination is made that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session. A user plane security policy is provided to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

According to still other embodiments of inventive concepts, a core network CN node is configured to operate in a communication network. The CN node includes processing circuitry, and memory coupled with the processing circuitry. The memory includes instructions that when executed by the processing circuitry causes the CN node to perform the following operations. A user plane session establishment request is obtained for a wireless device. An indication is obtained that the user plane session establishment request for the wireless device is associated with an emergency session and/or that null ciphering and/or null integrity protection are applied to a control plane associated with a control plane session for the wireless device. A determination is made that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session. A user plane security policy is provided to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

According to some embodiments, a wireless device (UE) participating in a limited service mode (e.g., an un-authenticated emergency session) may be configured so that confidentiality and/or integrity protection are not activated for DRBs established for the limited service mode.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 6 is a flow chart illustrating operations of an SMF node according to some embodiments of inventive concepts;

FIG. 7 is a flow chart illustrating operations of an AMF node according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
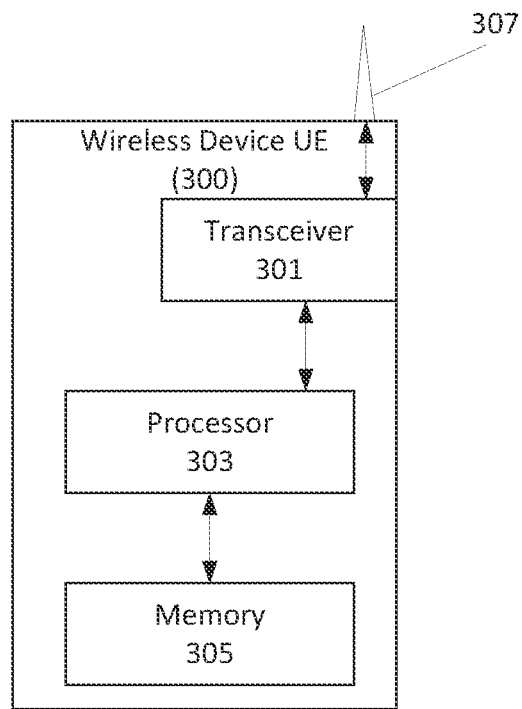
FIG. 3 is a block diagram illustrating a mobile terminal UE according to some embodiments of inventive concepts.

FIG. 3 is a block diagram illustrating elements of a wireless device UE (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. As shown, wireless device UE may include an antenna 307, and transceiver circuitry 301 (also referred to as a transceiver) including a transmitter and a receiver configured to provide uplink and downlink radio communications with a base station(s) of a radio access network. Wireless device UE may also include processing circuitry 303 (also referred to as a processor) coupled to the transceiver circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments).

Figure 4:
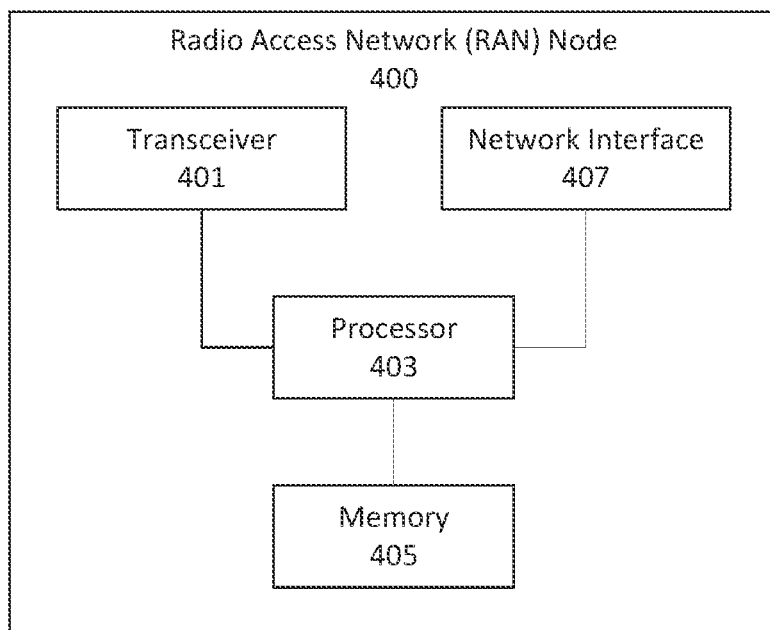
FIG. 4 is a block diagram illustrating a radio access network RAN node (e.g., a base station eNB/gNB) according to some embodiments of inventive concepts.

FIG. 4 is a block diagram illustrating elements of a radio access network node (also referred to as a network node, base station, eNodeB/eNB, gNodeB/gNB, etc.) of a Radio Access Network (RAN) configured to provide cellular communication according to embodiments of inventive concepts. As shown, the RAN node may include a transceiver circuitry 401 (also referred to as a transceiver) including a transmitter and a receiver configured to provide uplink and downlink radio communications with mobile terminals. The network node may include a network interface circuitry 407 (also referred to as a network interface) configured to provide communications with other nodes (e.g., with other base stations) of the RAN and/or core network CN. The network node may also include a processing circuitry 403 (also referred to as a processor) coupled to the transceiver circuitry, and a memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit communications through transceiver 401 over a radio interface to one or more mobile terminals UEs and/or to receive communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments).

According to some other embodiments, a network node may be implemented as a core network CN node without a transceiver. In such embodiments, transmission to a wireless device UE may be initiated by the network node so that transmission to the wireless device is provided through a network node including a transceiver, e.g., through a base station or RAN node. According to embodiments where the network node is a RAN node including a transceiver, initiating transmission may include transmitting through the transceiver.

Figure 5:
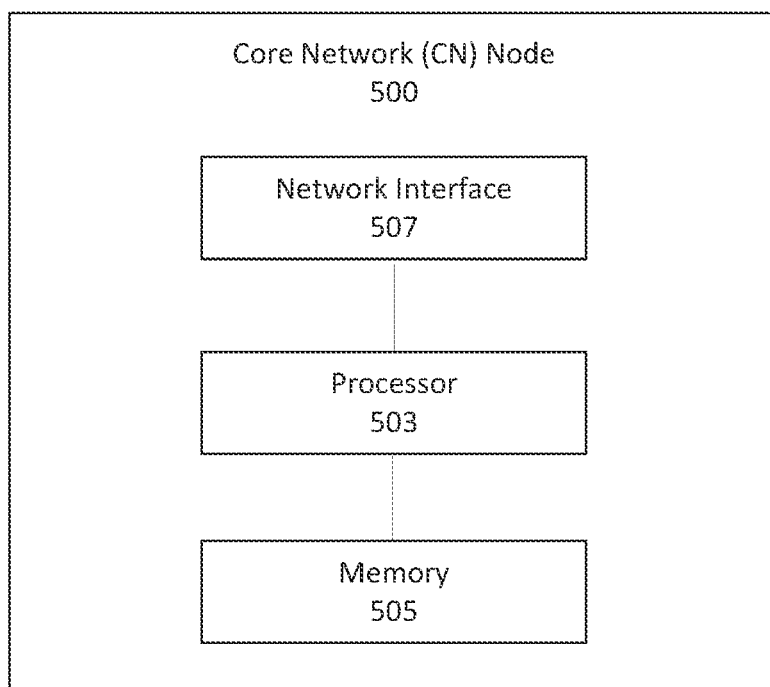
FIG. 5 is a block diagram illustrating a core network node (e.g., an AMF node, an SMF node, etc.) according to some embodiments of inventive concepts.

FIG. 5 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments).

As discussed above, the SRBs and DRBs belonging to an un-authenticated emergency session, in a 5G system might need to be un-ciphered (meaning no confidentiality protection) and non-integrity protected.

A technique to achieve the above requirement is the following. If the AMF allows an unauthenticated UE in LSM to establish bearers for an emergency session after it has received the emergency registration request message from the UE, the AMF sets the UE 5G security capabilities to only contain EIA0, EEA0, NIA0 and NEA0 when sending these to the 5G RAN in the relevant messages like NGAP UE INITIAL CONTEXT SETUP message, NGAP UE CONTEXT MODIFICATION REQUEST message, and NGAP HANDOVER REQUEST message. As a result of the AMF only sending a UE 5G security capability containing EIA0, EEA0, NIA0 and NEA0 to the 5G RAN when an emergency session is established, the 5G RAN may only be able to select a null integrity protection for AS integrity protection and a null ciphering algorithm for AS confidentiality protection between the RAN and UE. That is, if NIA0/NEA0 is used for NAS confidentiality/integrity protection, then NIA0/NEA0 or EIA0/EEA0 will always be used for AS integrity protection between the RAN and UE.

This known technique may work, but only partially and/or with potentially significant inconsistent implementations. Further description follows. In 4G/LTE, AS user plane (UP) security for DRBs is activated along with the AS control plane (CP) security activation for SRBs at the run of the AS SMC (Security Mode Command) procedure. Further, there may be no AS UP integrity protection for DRBs in 4G. This means only UP ciphering is activated at the run of AS SMC procedure. For an unauthenticated emergency session, when null ciphering is used for SRB, that null ciphering automatically applies for DRB as well. However, the same mechanism is not applicable in 5G, and hence a problem may occur. Further description follows.

In 5G, AS UP security activation has been decoupled from AS CP security activation. The AS CP security is activated by a run of the AS Security Mode Command (SMC) procedure which is a roundtrip of RRC messages between the UE and the RAN node. The procedure allows the negotiation of the cryptographic algorithms, the establishment of the ciphering and integrity protection keys, and the activation of the secure mode of the protocol. While the activation of AS CP security happens at the run of AS SMC procedure, the activation of the UP security in 5G takes place during another RRC signaling (called RRC reconfiguration procedure) between the UE and the RAN node (gNB or ng-eNB).

Therefore, the AMF setting the UE 5G security capabilities to only contain EIA0, EEA0, NIA0 and NEA0 when sending these to the 5G RAN covers only the AS CP security activation for SRBs in emergency session. There may be a challenge to correctly activating the AS UP security for DRBs in emergency session.

According to some embodiments of inventive concepts, a challenge of correctly activating AS UP security for DRBs in emergency session may be overcome/addressed so that unauthenticated emergency sessions can have DRBs without activation of confidentiality and integrity protection. Such embodiments may be lightweight and/or effective.

As discussed above, the SRBs and DRBs belonging to an un-authenticated emergency session, in the 5G system, might need to be un-ciphered and non-integrity protected. A further described above, the AMF sending the EIA0, EEA0, NIA0 and NEA0 to the RAN for emergency session may only cover SRBs and not the DRBs.

In 5G, while the activation of AS CP security happens at the run of AS SMC procedure, the activation of the UP security takes place during the PDU (Protocol Data Unit) Session establishment procedure which is a Non-Access Stratum (NAS) procedure between the UE and the SMF (via AMF) in the core network CN and which involves RRC signaling between the UE and the RAN node (gNB or ng-eNB).

The AS UP activation is based on the UP Security Policy, which is a PDU Session-specific parameter determined by the core network or SMF and signaled to the RAN node during the procedure run. The UP Security Policy indicates whether integrity or/and ciphering are to be activated for the session being set-up. The 3GPP TS 23.501 (Reference [2]) describes that the UP Security Policy indicates the following:

1. whether UP integrity protection is:
   a. Required: for all the traffic on the PDU Session UP integrity protection shall apply.
   b. Preferred: for all the traffic on the PDU Session UP integrity protection should apply.
   c. Not Needed: UP integrity protection shall not apply on the PDU Session.
2. whether UP confidentiality protection is:
   a. Required: for all the traffic on the PDU Session UP confidentiality protection shall apply.
   b. Preferred: for all the traffic on the PDU Session UP confidentiality protection should apply.
   c. Not Needed: UP confidentiality shall not apply on the PDU Session.

The RAN node will then take action according to the received UP Security Policy and signal the action to the UE via RRC signaling. The result is that based on the so-called action, all the Data Radio Bearers (DRBs) serving the PDU Session in question will have the same ciphering and integrity protection activation status, i.e. either all ON/OFF for ciphering and all ON/OFF for integrity protection.

According to some embodiments of inventive concepts, UEs participating in an un-authenticated emergency session (e.g., in limited service mode) will be configured in a such a way that confidentiality and integrity protection are not activated for DRBs established for emergency session. Some embodiments are listed below:

Some embodiments on the core network side are discussed below. Further discussion is provided with respect to FIGS. 2, 6, and 7.

In case of an emergency session, when the core network has chosen to use null ciphering and null integrity protection for SRBs, the core network indicates to the RAN that ciphering and integrity protections shall not be activated for DRBs.

The SMF "obtains" the information that the concerned PDU session establishment procedure belongs to the emergency session. Some ways of "obtains" follow:

If the AMF allows an unauthenticated UE in LSM to establish bearers for emergency session after it has received the emergency registration request message from the UE, then at the PDU Session establishment procedure used to establish a bearer for an emergency call, the AMF indicates to the SMF that the session belongs to emergency session. In other words, the SMF receives the information from the AMF.

If the UE initiates a PDU Session establishment procedure with the Request type set to "Emergency Request" as described in TS 23.501 (Reference [2]) and the SMF Emergency Configuration Data indicates that an unauthenticated UE in LSM is allowed to establish bearers for emergency. In other words, the SMF is configured to act accordingly based on the indication received from the UE.

The SMF determines that for emergency session, the UP security policy is as below:
1. UP integrity protection is "Not Needed"
   In other words, for this, only "Not Needed" is allowed. Therefore, "Required" and "Preferred" are not allowed.
2. UP confidentiality protection is "Not Needed"
   In other words, for this, only "Not Needed" is allowed. Therefore, "Required" and "Preferred" are not allowed.

The SMF provides the UP Security Policy to the gNB/ng-eNB.

Some embodiments on the radio access network side are discussed below. Further discussion is provided with respect to FIG. 8.

When the RAN receives only null ciphering and null integrity algorithms for SRBs, the RAN only accepts the UP security policy that indicates that ciphering and integrity protections shall not be activated for DRBs.

If the RAN cannot obey/follow the received UP Security Policy, then the RAN sends a failure message to the core network or SMF. This might happen if RAN is not allowed to use null ciphering or null integrity protection due to reasons, e.g., regulatory restrictions.

Figure 1:
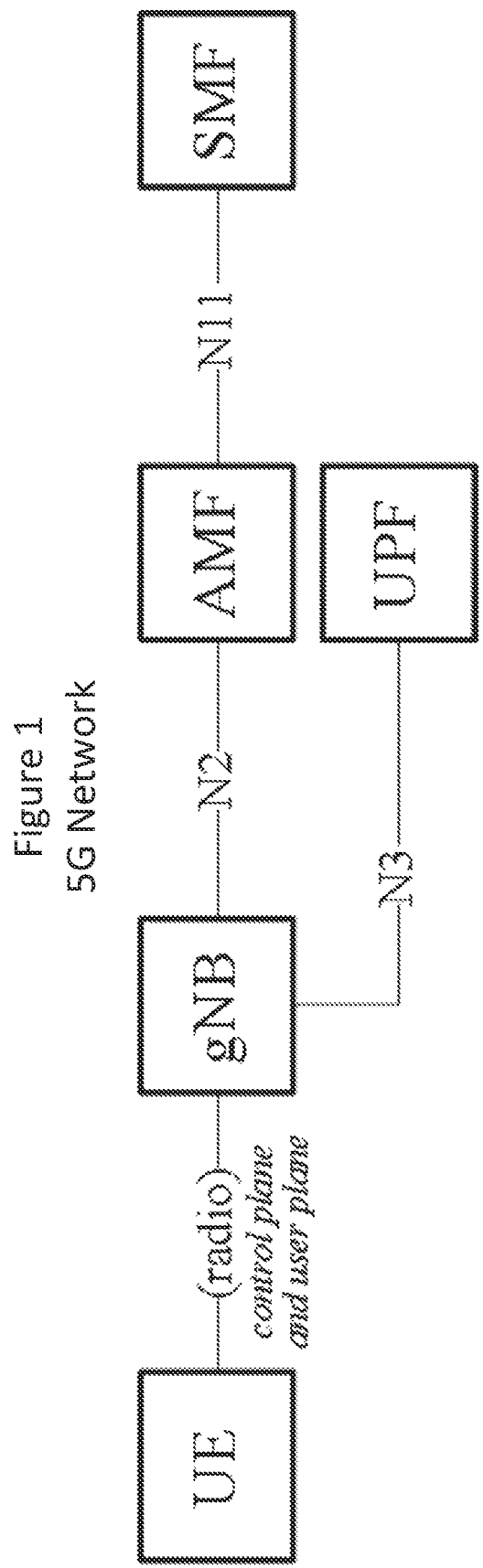
FIG. 1 is a block diagram illustrating elements of a 5G network.
Figure 2:
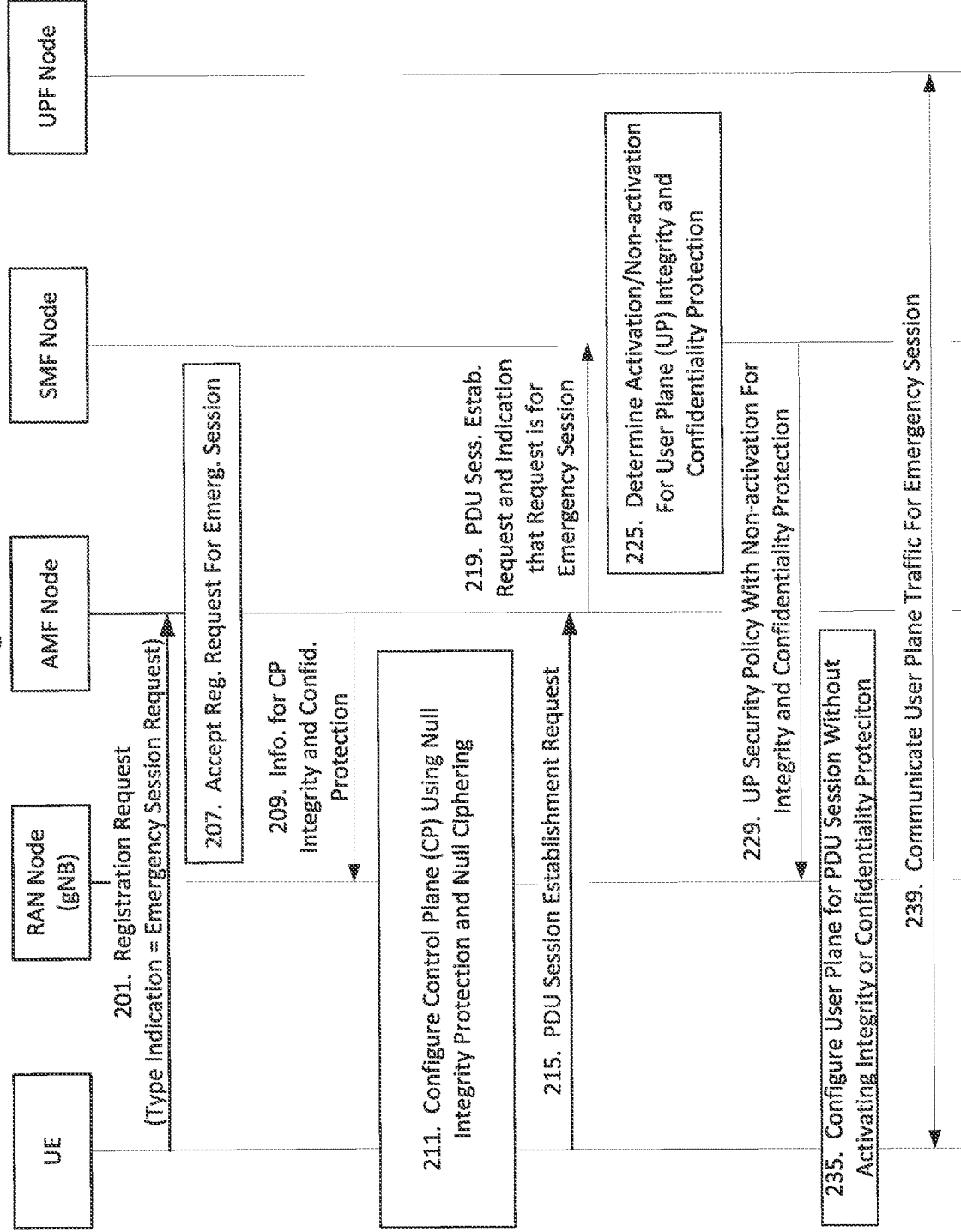
FIG. 2 is a message diagram illustrating messages/operations according to some embodiments of inventive concepts.

Network operations/messages will now be discussed below with respect to the message/operation diagram of FIG. 2. At operation/message 201, the AMF node may obtain a registration request from the wireless device UE with a type indication that the request is an emergency session request. At operation 207, the AMF node may accept the registration request for an emergency session even though the wireless device UE is operating in Limited Service Mode and/or the request is for an un-authenticated emergency session.

Responsive to obtaining/accepting the registration request, the AMF node may provide a control plane security policy to a radio access network RAN node associated with the wireless device UE at operation/message 209, wherein the control plane security policy includes an indication to configure a control plane for the user device using null ciphering and/or null integrity protection. Responsive to receiving the control plane security policy, the RAN node may configure a control plane for the wireless device using null integrity protection and null ciphering at operation 211.

At operation/message 215, the AMF node may obtain a user plane session establishment request from the wireless device. Responsive to obtaining the user plane session establishment request from the wireless device, the AMF node may provide to the SMF node at operation/message 219 an indication that the user plane session establishment request for the wireless device is associated with an emergency session and/or that null ciphering and/or null integrity protection are applied to a control plane associated with the user plane session. At operation/message 219, the SMF node may thus obtain the user plane session establishment request for the wireless device UE and an indication that the user plane session establishment request for the wireless device is associated with an emergency session and/or that null ciphering and/or null integrity protection are applied to a control plane associated with a control plane session for the wireless device.

At operation 225, the SMF node may determine that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session. At block 229, the SMF node may provide a user plane security policy to the radio access network RAN node associated with the wireless device UE, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

At operation/message 235, the RAN node may configure the user plane for the wireless device based on the user plane security policy responsive to receiving the user plane security policy indicating no activation of integrity protection and no activation of confidentiality protection for the user plane. At operation/message 239, user plane traffic may be communicated for the emergency session with no integrity protection and no confidentiality protection for the user plane.

Operations of the SMF node (implemented using the structure of FIG. 5) according to embodiments of FIG. 2 will now be discussed with reference to the flow chart of FIG. 6 according to some embodiments of inventive concepts. For example, modules may be stored in memory 505 of FIG. 5, and these modules may provide instructions so that when the instructions of a module are executed by respective SMF node processing circuitry 503, processing circuitry 503 performs respective operations of the flow chart.

At block 619, SMF node processing circuitry 503 may obtain a user plane session establishment request for wireless device UE and an indication that the user plane session establishment request for the wireless device UE is associated with an emergency session and/or that null ciphering and/or null integrity protection are applied to a control plane associated with a control plane session for the wireless device UE. The obtaining of block 619 may occur as discussed above with respect to operation/message 219 of FIG. 2. For example, processing circuitry 503 may receive the user plane session establishment request and the indication from the AMF node through network interface circuitry 507.

The user plane session establishment request may include the indication that the user plane session establishment request is associated with the emergency session and/or that null ciphering and/or null integrity protection are applied to the control plane associated with the control plane session. Moreover, the wireless device may be operating in a Limited Service Mode LSM, and/or the user plane session establishment request may be a request for an un-authenticated emergency session. In addition, the control plane session may be associated with the user plane session, and/or the control plane session may be associated with the emergency session.

According to some embodiments, obtaining the user plane session establishment request at block 619 may include receiving the user plane session establishment request from the AMF node, and/or obtaining the indication at block 619 may include receiving the indication from the AMF node. According to some embodiments, the indication may be provided by the AMF node, and/or the indication may be provided by the wireless device UE.

At block 625, SMF node processing circuitry 503 may determine that a user plane should be configured for the user plane session for the wireless device UE without activating integrity and/or confidentiality protection for the user plane based on the indication that the user plane session establishment request for the wireless device UE is associated with an emergency session and/or that null ciphering and/or null integrity protection are applied to the control plane associated with the control plane session. The determining of block 625 may occur as discussed above with respect to operation/message 225 of FIG. 2. The user plane security policy may include an indication to not activate integrity and/or confidentiality protection of the user plane for the wireless device UE.

At block 629, SMF node processing circuitry 503 may provide a user plane security policy to a radio access network RAN node associated with the wireless device UE. The user plane security policy may indicate to configure the user plane for the user plane session for the wireless device UE without activating integrity and/or confidentiality protection based on determining that a user plane should be configured for the user plane session for the wireless device without activating integrity and/or confidentiality protection. The providing of block 629 may occur as discussed above with respect to operation/message 229 of FIG. 2. For example, processing circuitry 503 may transmit the user plane security policy through network interface circuitry 507 to the RAN node.

Various operations from the flow chart of FIG. 6 may be optional with respect to some embodiments of SMF nodes and related methods.

Operations of the AMF node according to embodiments of FIG. 2 (implemented using the structure of FIG. 5) will now be discussed with reference to the flow chart of FIG. 7 according to some embodiments of inventive concepts. For example, modules may be stored in memory 505 of FIG. 5, and these modules may provide instructions so that when the instructions of a module are executed by respective AMF node processing circuitry 503, processing circuitry 503 performs respective operations of the flow chart.

At block 701, AMF node processing circuitry 503 may obtain a registration request from a wireless device UE. The obtaining of block 701 may occur as discussed above with respect to operation/message 201 of FIG. 2. For example, AMF node processing circuitry 503 may receive the registration request from the wireless device UE through the RAN node and through network interface circuitry 507. The registration request may include an indication that the request is for an emergency session.

At block 707, AMF node processing circuitry 503 may accept the registration request. The accepting of block 707 may occur as discussed above with respect to operation 207 of FIG. 2.

At block 709, AMF node processing circuitry 503 may provide a control plane security policy to a radio access network RAN node associated with the wireless device UE responsive to obtaining and/or accepting the registration request. The control plane security policy may include an indication to configure a control plane for the wireless device using null ciphering and/or null integrity protection. The providing of block 709 may occur as discussed above with respect to message/operation 209 of FIG. 2. For example, the AMF node processing circuitry 503 may transmit the control plane security policy through network interface circuitry 507 to the RAN node.

At block 715, AMF node processing circuitry 503 may obtain a user plane session establishment request from the wireless device UE. The obtaining of block 715 may occur as discussed above with respect to operation/message 215 of FIG. 2. For example, AMF node processing circuitry 503 may receive the user plane session establishment request from the wireless device UE through the RAN node and through network interface circuitry 507.

At block 719, AMF node processing circuitry 503 may provide an indication to the SMF node responsive to obtaining the user plane session establishment request from the wireless device. The indication may indicate that the user plane session establishment request for the wireless device is associated with an emergency session and/or that null ciphering and/or null integrity protection are applied to a control plane associated with the user plane session. The providing of block 719 may occur as discussed above with respect to message/operation 219 of FIG. 2. For example, the AMF node processing circuitry 503 may transmit the indication through network interface circuitry 507 to the SMF node.

Providing the indication at block 719 may include forwarding the user plane session establishment request with the indication that the user plane session establishment request is associated with an emergency session and/or that null ciphering and/or null integrity protection are applied to a control plane associated with the user plane session.

The indication that the user plane session establishment request for the wireless device UE is associated with an emergency session and/or that null ciphering and/or null integrity protection are applied to a control plane associated with the user plane session may be generated by the AMF node. The indication that the user plane session establishment request for the wireless device UE is associated with an emergency session and/or that null ciphering and/or null integrity protection are applied to a control plane associated with the user plane session may be received with the user plane session establishment request from the wireless device.

The wireless device may be operating in a Limited Service Mode LSM. In such embodiments, the control plane security policy may include the indication to configure the control plane for the wireless device using null ciphering and/or null integrity protection responsive to the wireless device operating in the Limited Service Mode, and/or the indication that the user plane session establishment request for the wireless device is associated with the emergency session and/or that null ciphering and/or null integrity protection are applied to the control plane associated with the user plane session may be transmitted responsive to the wireless device operating in the Limited Service Mode.

The user plane session establishment request may be a request for an un-authenticated emergency session. In such embodiments, the control plane security policy may include the indication to configure the control plane for the wireless device using null ciphering and/or null integrity protection responsive to the request being for an un-authenticated emergency session, and/or the indication that the user plane session establishment request for the wireless device is associated with the emergency session and/or that null ciphering and/or null integrity protection are applied to the control plane associated with the user plane session is transmitted responsive to the request being for an un-authenticated emergency session.

Various operations from the flow chart of FIG. 7 may be optional with respect to some embodiments of AMF nodes and related methods. Regarding methods of example embodiment 15 (set forth below), for example, operations of block 707 of FIG. 7 may be optional.

Operations of a RAN node according to some alternative embodiments (implemented using the structure of FIG. 4) will now be discussed with reference to the flow chart of FIG. 8 according to some embodiments of inventive concepts. For example, modules may be stored in memory 405 of FIG. 4, and these modules may provide instructions so that when the instructions of a module are executed by respective RAN node processing circuitry 403, processing circuitry 403 performs respective operations of the flow chart.

At blocks 801 and 805, RAN node processing circuitry 403 may receive control plane configuration information from a core network (e.g., from an AMF node) to configure a control plane for a wireless terminal UE using null integrity protection and/or null ciphering.

At block 809, RAN node processing circuitry 403 may configure the control plane using null integrity protection and/or null ciphering responsive to receiving the control plane configuration information.

At blocks 811 and 815, RAN node processing circuitry 403 may receive a user plane security policy for the wireless terminal UE with the control plane configured using null integrity protection and/or null ciphering. The user plane security policy, for example, may be received by RAN node processing circuitry 403 from an SMF node of the core network through network interface circuitry 407. At block 819, RAN node processing circuitry 403 may determine whether the user plane security policy indicates activation or non-activation of integrity and/or confidentiality protection for the user plane, and at blocks 821/831, RAN node processing circuitry 403 may only accept a user plane security policy that indicates no activation of integrity and/or confidentiality protection for the user plane.

For example, RAN node processing circuitry 403 may receive a user plane security policy at blocks 815 and 819 for the wireless device UE from the core network (e.g., from an SMF node) that indicates activation of integrity protection and/or activation of confidentiality protection of the user plane. Accordingly, RAN node processing circuitry 403 may reject the user plane security policy for the wireless device at block 821 responsive to the user plane security policy indicating activation of integrity protection and/or activation of confidentiality protection for the user plane, and the RAN node processing circuitry 403 may transmit a failure message to the core network (e.g., to the SMF node) at block 825 responsive to the user plane security policy indicating activation of integrity protection and/or activation of confidentiality protection for the user plane. For example, the RAN node processing circuitry 403 may transmit the failure message through network interface circuitry 407 to the core network (e.g., to the SMF node).

In an alternative, RAN node processing circuitry 403 may receive a user plane security policy at blocks 815 and 819 for the wireless device from the core network (e.g., from an SMF node) that indicates no activation of integrity protection and no activation of confidentiality protection for the user plane. Accordingly, RAN node processing circuitry 403 may accept the user plane security policy for the wireless device UE at block 831 responsive to the user plane security policy indicating no activation of integrity protection and no activation of confidentiality protection for the user plane, and the RAN node processing circuitry 403 may configure the user plane for the wireless device at block 835 based on the user plane security policy responsive to the user plane security policy indicating no activation of integrity protection and no activation of confidentiality protection for the user plane.

Figure 8:
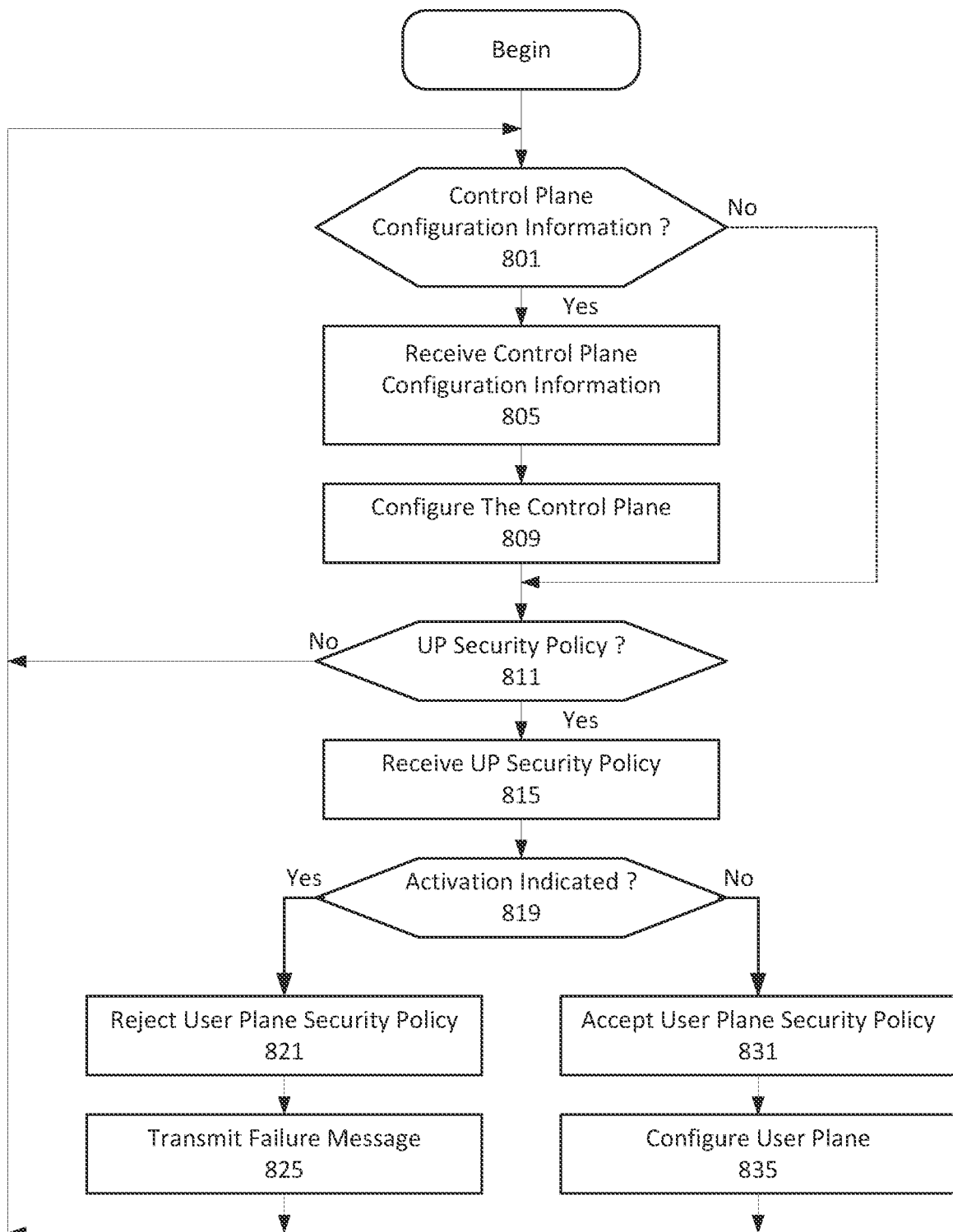
FIG. 8 is a flow chart illustrating operations of a RAN node according to some embodiments of inventive concepts.

Various operations from the flow chart of FIG. 8 may be optional with respect to some embodiments of RAN nodes and related methods. Regarding methods of example embodiment 30 (set forth below), for example, operations of blocks 801, 815, 819, 825, and/or 835 of FIG. 8 may be optional.

Example embodiments are discussed below.

1. A method of operating a core network node in a wireless communication system to determine user plane security activation, the method comprising: obtaining (219, 619) a user plane session establishment request for a wireless device; obtaining (219, 619) an indication that the user plane session establishment request for the wireless device is associated with an emergency session and/or that null ciphering and/or null integrity protection are applied to a control plane associated with a control plane session for the wireless device; determining (225, 625) that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session; and providing (229, 629) a user plane security policy to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

2. The method of Embodiment 1, wherein the user plane session establishment request includes the indication that the user plane session establishment request is associated with the emergency session and/or that null ciphering and/or null integrity protection are applied to the control plane associated with the control plane session.

3. The method of any of Embodiments 1-2, wherein the user plane security policy comprises an indication to not activate integrity and/or confidentiality protection of the user plane for the wireless device.

4. The method according to any of Embodiments 1-3, wherein the core network node comprises a Session Management Function, SMF, node.

5. The method according to Embodiment 4, wherein obtaining the user plane session establishment request comprises receiving the user plane session establishment request from an Access and Mobility Management Function, AMF, node and/or wherein obtaining the indication comprises receiving the indication from the AMF node.

6. The method of Embodiment 5, wherein the indication is provided by the AMF node.

7. The method of any of Embodiments 1-5, wherein the indication is provided by the wireless device.

8. The method of any of Embodiments 1-7, wherein the wireless device is operating in a Limited Service Mode, LSM.

9. The method of any of Embodiments 1-8, where the user plane session establishment request is a request for an un-authenticated emergency session.

10. The method of any of Embodiments 1-9, wherein the control plane session is associated with the user plane session and/or wherein the control plane session is associated with the emergency session.

11. A core network, CN, node (500) configured to operate in a communication network, the CN node comprising: processing circuitry (503); and memory (505) coupled with the processing circuitry, wherein the memory includes instructions that when executed by the processing circuitry causes the CN node to perform operations according to any of Embodiments 1-10.

12. A core network, CN, node (500) configured to operate in a wireless communication network, wherein the CN node is adapted to perform according to any of Embodiments 1-10.

13. A computer program comprising program code to be executed by processing circuitry (403) of a core network, CN, node (500) configured to operate in a communication network, whereby execution of the program code causes the CN node (500) to perform operations according to any one of embodiments 1-10.

14. A computer program product comprising a non-transitory storage medium including program code to be executed by processing circuitry (503) of a core network, CN, node (500) of a communication network, whereby execution of the program code causes the CN node (500) to perform operations according to any one of embodiments 1-10.

15. A method of operating a first core network node in a wireless communication system, the method comprising: obtaining (201, 701) a registration request from a wireless device; responsive to obtaining the registration request, providing (209, 709) a control plane security policy to a radio access network, RAN, node associated with the wireless device, wherein the control plane security policy includes an indication to configure a control plane for the wireless device using null ciphering and/or null integrity protection; obtaining (215, 715) a user plane session establishment request from the wireless device; and responsive to obtaining the user plane session establishment request from the wireless device, providing (219, 719) to a second core network node an indication that the user plane session establishment request for the wireless device is associated with an emergency session and/or that null ciphering and/or null integrity protection are applied to a control plane associated with the user plane session.

16. The method of Embodiment 15, wherein providing the indication comprises forwarding the user plane session establishment request with the indication that the user plane session establishment request is associated with an emergency session and/or that null ciphering and/or null integrity protection are applied to a control plane associated with the user plane session.

17. The method according to any of Embodiments 15-16, wherein the first core network node comprises an Access and Mobility Management Function, AMF, node.

18. The method according to Embodiment 17, wherein the second core network node comprises a Session Management Function, SMF, node.

19. The method of any of Embodiments 17-18, wherein the indication that the user plane session establishment request for the wireless device is associated with an emergency session and/or that null ciphering and/or null integrity protection are applied to a control plane associated with the user plane session is generated by the AMF node.

20. The method of any of Embodiments 15-19, wherein the indication that the user plane session establishment request for the wireless device is associated with an emergency session and/or that null ciphering and/or null integrity protection are applied to a control plane associated with the user plane session is received with the user plane session establishment request from the wireless device.

21. The method of any of Embodiments 15-20, wherein the wireless device is operating in a Limited Service Mode, LSM.

22. The method of Embodiment 21, wherein the control plane security policy includes the indication to configure the control plane for the wireless device using null ciphering and/or null integrity protection responsive to the wireless device operating in the Limited Service Mode, and/or wherein the indication that the user plane session establishment request for the wireless device is associated with the emergency session and/or that null ciphering and/or null integrity protection are applied to the control plane associated with the user plane session is transmitted responsive to the wireless device operating in the Limited Service Mode.

23. The method of any of Embodiments 15-22, where the user plane session establishment request is a request for an un-authenticated emergency session.

24. The method of Embodiment 23, wherein the control plane security policy includes the indication to configure the control plane for the wireless device using null ciphering and/or null integrity protection responsive to the request being for an un-authenticated emergency session, and/or wherein the indication that the user plane session establishment request for the wireless device is associated with the emergency session and/or that null ciphering and/or null integrity protection are applied to the control plane associated with the user plane session is transmitted responsive to the request being for an un-authenticated emergency session.

25. The method of any of Embodiments 15-24, wherein the registration request includes an indication that the request is for an emergency session.

26. A first core network, CN, node (500) configured to operate in a communication network, the CN node comprising: processing circuitry (503); and memory (505) coupled with the processing circuitry, wherein the memory includes instructions that when executed by the processing circuitry causes the first CN node to perform operations according to any of Embodiments 15-25.

27. A first core network, CN, node (500) configured to operate in a wireless communication network, wherein the first CN node is adapted to perform according to any of Embodiments 15-25.

28. A computer program comprising program code to be executed by processing circuitry (403) of a first core network, CN, node (500) configured to operate in a communication network, whereby execution of the program code causes the first CN node (500) to perform operations according to any one of embodiments 15-25.

29. A computer program product comprising a non-transitory storage medium including program code to be executed by processing circuitry (503) of a first core network, CN, node (500) of a communication network, whereby execution of the program code causes the first CN node (500) to perform operations according to any one of embodiments 15-25.

30. A method of operating a radio access network node, RAN, in a wireless communication network, the method comprising: receiving (805) control plane configuration information from a core network to configure a control plane for a wireless terminal using null integrity protection and/or null ciphering; responsive to receiving the control plane configuration information, configuring (809) the control plane using null integrity protection and/or null ciphering; and responsive to receiving a user plane security policy for the wireless terminal with the control plane configured using null integrity protection and/or null ciphering, only accepting (821, 831) a user plane security policy that indicates no activation of integrity and/or confidentiality protection for the user plane.

31. The method of Embodiment 30, further comprising: receiving (815) a user plane security policy for the wireless device from the core network; wherein only accepting comprises rejecting (821) the user plane security policy for the wireless device responsive to the user plane security policy indicating activation of integrity protection and/or activation of confidentiality protection for the user plane.

32. The method of Embodiment 31 further comprising: transmitting (825) a failure message to the core network responsive to the user plane security policy indicating activation of integrity protection and/or activation of confidentiality protection for the user plane.

33. The method of Embodiment 30, further comprising: receiving (815) a user plane security policy for the wireless device from the core network; wherein only accepting comprises accepting (831) the user plane security policy for the wireless device responsive to the user plane security policy indicating no activation of integrity protection and no activation of confidentiality protection for the user plane.

34. The method of Embodiment 33 further comprising: configuring (835) the user plane for the wireless device based on the user plane security policy responsive to the user plane security policy indicating no activation of integrity protection and no activation of confidentiality protection for the user plane.

35. The method of any of Embodiments 30-34, wherein the control plane configuration information is received from an AMF node of the core network, and/or wherein the user plane security policy is received from an SMF node of the core network.

36. A radio access network, RAN, node (400) configured to operate in a wireless communication network, the RAN node comprising: processing circuitry (403); and memory (405) coupled with the processing circuitry, wherein the memory includes instructions that when executed by the processing circuitry causes the RAN node to perform operations according to any of Embodiments 30-35.

37. A first radio access network, RAN, node (400) configured to operate in a wireless communication network, wherein the RAN node is adapted to perform according to any of Embodiments 30-b 35.

38. A computer program comprising program code to be executed by processing circuitry (403) of a radio access network, RAN, node (400) configured to operate in a wireless communication network, whereby execution of the program code causes the first RAN node (400) to perform operations according to any one of embodiments 30-35.

39. A computer program product comprising a non-transitory storage medium including program code to be executed by processing circuitry (403) of a first radio access network, RAN, node (400) of a wireless communication network, whereby execution of the program code causes the first RAN node (400) to perform operations according to any one of embodiments 30-35.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
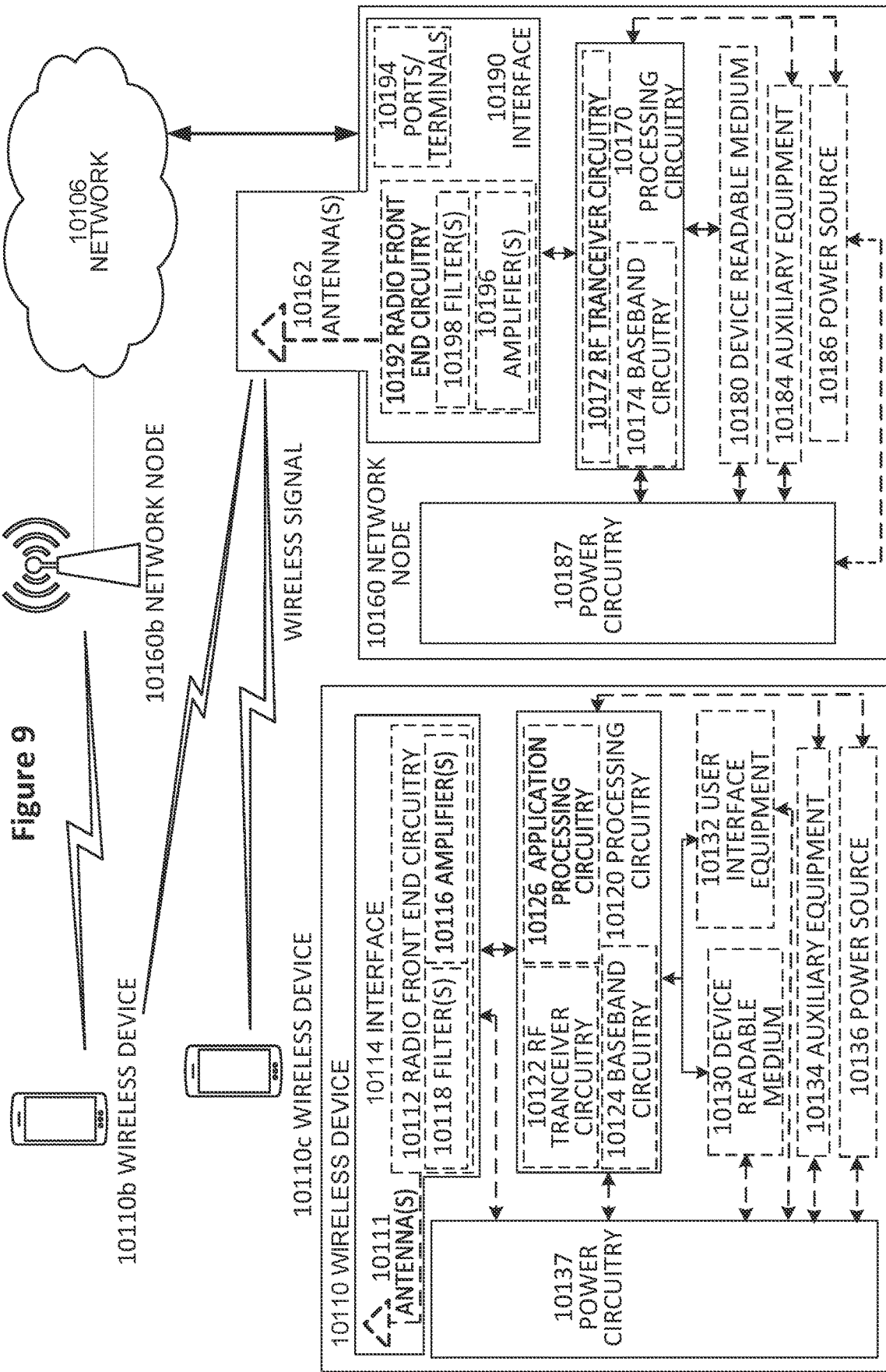
FIG. 9 is a block diagram of a wireless network in accordance with some embodiments.

FIG. 9: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 10106, network nodes 10160 and 10160b, and WDs 10110, 10110b, and 10110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 10160 and wireless device (WD) 10110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 10106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 10160 and WD 10110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 10160 includes processing circuitry 10170, device readable medium 10180, interface 10190, auxiliary equipment 10184, power source 10186, power circuitry 10187, and antenna 10162. Although network node 10160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 10160 are depicted as single boxes located within a larger box, or nested within multiple boxes, in practice, a network node may comprise multiple different physical components that make up a single illustrated component (e.g., device readable medium 10180 may comprise multiple separate hard drives as well as multiple RAM modules).

Similarly, network node 10160 may be composed of multiple physically separate components (e.g., a NodeB component and a RNC component, or a BTS component and a BSC component, etc.), which may each have their own respective components. In certain scenarios in which network node 10160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 10160 may be configured to support multiple radio access technologies (RATs). In such embodiments, some components may be duplicated (e.g., separate device readable medium 10180 for the different RATs) and some components may be reused (e.g., the same antenna 10162 may be shared by the RATs). Network node 10160 may also include multiple sets of the various illustrated components for different wireless technologies integrated into network node 10160, such as, for example, GSM, WCDMA, LTE, NR, WiFi, or Bluetooth wireless technologies. These wireless technologies may be integrated into the same or different chip or set of chips and other components within network node 10160.

Processing circuitry 10170 is configured to perform any determining, calculating, or similar operations (e.g., certain obtaining operations) described herein as being provided by a network node. These operations performed by processing circuitry 10170 may include processing information obtained by processing circuitry 10170 by, for example, converting the obtained information into other information, comparing the obtained information or converted information to information stored in the network node, and/or performing one or more operations based on the obtained information or converted information, and as a result of said processing making a determination.

Processing circuitry 10170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 10160 components, such as device readable medium 10180, network node 10160 functionality. For example, processing circuitry 10170 may execute instructions stored in device readable medium 10180 or in memory within processing circuitry 10170. Such functionality may include providing any of the various wireless features, functions, or benefits discussed herein. In some embodiments, processing circuitry 10170 may include a system on a chip (SOC).

In some embodiments, processing circuitry 10170 may include one or more of radio frequency (RF) transceiver circuitry 10172 and baseband processing circuitry 10174. In some embodiments, radio frequency (RF) transceiver circuitry 10172 and baseband processing circuitry 10174 may be on separate chips (or sets of chips), boards, or units, such as radio units and digital units. In alternative embodiments, part or all of RF transceiver circuitry 10172 and baseband processing circuitry 10174 may be on the same chip or set of chips, boards, or units In certain embodiments, some or all of the functionality described herein as being provided by a network node, base station, eNB or other such network device may be performed by processing circuitry 10170 executing instructions stored on device readable medium 10180 or memory within processing circuitry 10170. In alternative embodiments, some or all of the functionality may be provided by processing circuitry 10170 without executing instructions stored on a separate or discrete device readable medium, such as in a hard-wired manner. In any of those embodiments, whether executing instructions stored on a device readable storage medium or not, processing circuitry 10170 can be configured to perform the described functionality. The benefits provided by such functionality are not limited to processing circuitry 10170 alone or to other components of network node 10160, but are enjoyed by network node 10160 as a whole, and/or by end users and the wireless network generally.

Device readable medium 10180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 10170. Device readable medium 10180 may store any suitable instructions, data or information, including a computer program, software, an application including one or more of logic, rules, code, tables, etc. and/or other instructions capable of being executed by processing circuitry 10170 and, utilized by network node 10160. Device readable medium 10180 may be used to store any calculations made by processing circuitry 10170 and/or any data received via interface 10190. In some embodiments, processing circuitry 10170 and device readable medium 10180 may be considered to be integrated.

Interface 10190 is used in the wired or wireless communication of signalling and/or data between network node 10160, network 10106, and/or WDs 10110. As illustrated, interface 10190 comprises port(s)/terminal(s) 10194 to send and receive data, for example to and from network 10106 over a wired connection. Interface 10190 also includes radio front end circuitry 10192 that may be coupled to, or in certain embodiments a part of, antenna 10162. Radio front end circuitry 10192 comprises filters 10198 and amplifiers 10196. Radio front end circuitry 10192 may be connected to antenna 10162 and processing circuitry 10170. Radio front end circuitry may be configured to condition signals communicated between antenna 10162 and processing circuitry 10170. Radio front end circuitry 10192 may receive digital data that is to be sent out to other network nodes or WDs via a wireless connection. Radio front end circuitry 10192 may convert the digital data into a radio signal having the appropriate channel and bandwidth parameters using a combination of filters 10198 and/or amplifiers 10196. The radio signal may then be transmitted via antenna 10162. Similarly, when receiving data, antenna 10162 may collect radio signals which are then converted into digital data by radio front end circuitry 10192. The digital data may be passed to processing circuitry 10170. In other embodiments, the interface may comprise different components and/or different combinations of components.

In certain alternative embodiments, network node 10160 may not include separate radio front end circuitry 10192, instead, processing circuitry 10170 may comprise radio front end circuitry and may be connected to antenna 10162 without separate radio front end circuitry 10192. Similarly, in some embodiments, all or some of RF transceiver circuitry 10172 may be considered a part of interface 10190. In still other embodiments, interface 10190 may include one or more ports or terminals 10194, radio front end circuitry 10192, and RF transceiver circuitry 10172, as part of a radio unit (not shown), and interface 10190 may communicate with baseband processing circuitry 10174, which is part of a digital unit (not shown).

Antenna 10162 may include one or more antennas, or antenna arrays, configured to send and/or receive wireless signals. Antenna 10162 may be coupled to radio front end circuitry 10190 and may be any type of antenna capable of transmitting and receiving data and/or signals wirelessly. In some embodiments, antenna 10162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 10162 may be separate from network node 10160 and may be connectable to network node 10160 through an interface or port.

Antenna 10162, interface 10190, and/or processing circuitry 10170 may be configured to perform any receiving operations and/or certain obtaining operations described herein as being performed by a network node. Any information, data and/or signals may be received from a wireless device, another network node and/or any other network equipment. Similarly, antenna 10162, interface 10190, and/or processing circuitry 10170 may be configured to perform any transmitting operations described herein as being performed by a network node. Any information, data and/or signals may be transmitted to a wireless device, another network node and/or any other network equipment.

Power circuitry 10187 may comprise, or be coupled to, power management circuitry and is configured to supply the components of network node 10160 with power for performing the functionality described herein. Power circuitry 10187 may receive power from power source 10186. Power source 10186 and/or power circuitry 10187 may be configured to provide power to the various components of network node 10160 in a form suitable for the respective components (e.g., at a voltage and current level needed for each respective component). Power source 10186 may either be included in, or external to, power circuitry 10187 and/or network node 10160. For example, network node 10160 may be connectable to an external power source (e.g., an electricity outlet) via an input circuitry or interface such as an electrical cable, whereby the external power source supplies power to power circuitry 10187. As a further example, power source 10186 may comprise a source of power in the form of a battery or battery pack which is connected to, or integrated in, power circuitry 10187. The battery may provide backup power should the external power source fail. Other types of power sources, such as photovoltaic devices, may also be used.

Alternative embodiments of network node 10160 may include additional components beyond those shown in FIG. 9 that may be responsible for providing certain aspects of the network node's functionality, including any of the functionality described herein and/or any functionality necessary to support the subject matter described herein. For example, network node 10160 may include user interface equipment to allow input of information into network node 10160 and to allow output of information from network node 10160. This may allow a user to perform diagnostic, maintenance, repair, and other administrative functions for network node 10160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band interne of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 10110 includes antenna 10111, interface 10114, processing circuitry 10120, device readable medium 10130, user interface equipment 10132, auxiliary equipment 10134, power source 10136 and power circuitry 10137. WD 10110 may include multiple sets of one or more of the illustrated components for different wireless technologies supported by WD 10110, such as, for example, GSM, WCDMA, LTE, NR, WiFi, WiMAX, or Bluetooth wireless technologies, just to mention a few. These wireless technologies may be integrated into the same or different chips or set of chips as other components within WD 10110.

Antenna 10111 may include one or more antennas or antenna arrays, configured to send and/or receive wireless signals, and is connected to interface 10114. In certain alternative embodiments, antenna 10111 may be separate from WD 10110 and be connectable to WD 10110 through an interface or port. Antenna 10111, interface 10114, and/or processing circuitry 10120 may be configured to perform any receiving or transmitting operations described herein as being performed by a WD. Any information, data and/or signals may be received from a network node and/or another WD. In some embodiments, radio front end circuitry and/or antenna 10111 may be considered an interface.

As illustrated, interface 10114 comprises radio front end circuitry 10112 and antenna 10111. Radio front end circuitry 10112 comprise one or more filters 10118 and amplifiers 10116. Radio front end circuitry 10114 is connected to antenna 10111 and processing circuitry 10120, and is configured to condition signals communicated between antenna 10111 and processing circuitry 10120. Radio front end circuitry 10112 may be coupled to or a part of antenna 10111. In some embodiments, WD 10110 may not include separate radio front end circuitry 10112; rather, processing circuitry 10120 may comprise radio front end circuitry and may be connected to antenna 10111. Similarly, in some embodiments, some or all of RF transceiver circuitry 10122 may be considered a part of interface 10114. Radio front end circuitry 10112 may receive digital data that is to be sent out to other network nodes or WDs via a wireless connection. Radio front end circuitry 10112 may convert the digital data into a radio signal having the appropriate channel and bandwidth parameters using a combination of filters 10118 and/or amplifiers 10116. The radio signal may then be transmitted via antenna 10111. Similarly, when receiving data, antenna 10111 may collect radio signals which are then converted into digital data by radio front end circuitry 10112. The digital data may be passed to processing circuitry 10120. In other embodiments, the interface may comprise different components and/or different combinations of components.

Processing circuitry 10120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 10110 components, such as device readable medium 10130, WD 10110 functionality. Such functionality may include providing any of the various wireless features or benefits discussed herein. For example, processing circuitry 10120 may execute instructions stored in device readable medium 10130 or in memory within processing circuitry 10120 to provide the functionality disclosed herein.

As illustrated, processing circuitry 10120 includes one or more of RF transceiver circuitry 10122, baseband processing circuitry 10124, and application processing circuitry 10126. In other embodiments, the processing circuitry may comprise different components and/or different combinations of components. In certain embodiments processing circuitry 10120 of WD 10110 may comprise a SOC. In some embodiments, RF transceiver circuitry 10122, baseband processing circuitry 10124, and application processing circuitry 10126 may be on separate chips or sets of chips. In alternative embodiments, part or all of baseband processing circuitry 10124 and application processing circuitry 10126 may be combined into one chip or set of chips, and RF transceiver circuitry 10122 may be on a separate chip or set of chips. In still alternative embodiments, part or all of RF transceiver circuitry 10122 and baseband processing circuitry 10124 may be on the same chip or set of chips, and application processing circuitry 10126 may be on a separate chip or set of chips. In yet other alternative embodiments, part or all of RF transceiver circuitry 10122, baseband processing circuitry 10124, and application processing circuitry 10126 may be combined in the same chip or set of chips. In some embodiments, RF transceiver circuitry 10122 may be a part of interface 10114. RF transceiver circuitry 10122 may condition RF signals for processing circuitry 10120.

In certain embodiments, some or all of the functionality described herein as being performed by a WD may be provided by processing circuitry 10120 executing instructions stored on device readable medium 10130, which in certain embodiments may be a computer-readable storage medium. In alternative embodiments, some or all of the functionality may be provided by processing circuitry 10120 without executing instructions stored on a separate or discrete device readable storage medium, such as in a hard-wired manner. In any of those particular embodiments, whether executing instructions stored on a device readable storage medium or not, processing circuitry 10120 can be configured to perform the described functionality. The benefits provided by such functionality are not limited to processing circuitry 10120 alone or to other components of WD 10110, but are enjoyed by WD 10110 as a whole, and/or by end users and the wireless network generally.

Processing circuitry 10120 may be configured to perform any determining, calculating, or similar operations (e.g., certain obtaining operations) described herein as being performed by a WD. These operations, as performed by processing circuitry 10120, may include processing information obtained by processing circuitry 10120 by, for example, converting the obtained information into other information, comparing the obtained information or converted information to information stored by WD 10110, and/or performing one or more operations based on the obtained information or converted information, and as a result of said processing making a determination.

Device readable medium 10130 may be operable to store a computer program, software, an application including one or more of logic, rules, code, tables, etc. and/or other instructions capable of being executed by processing circuitry 10120. Device readable medium 10130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 10120. In some embodiments, processing circuitry 10120 and device readable medium 10130 may be considered to be integrated.

User interface equipment 10132 may provide components that allow for a human user to interact with WD 10110. Such interaction may be of many forms, such as visual, audial, tactile, etc. User interface equipment 10132 may be operable to produce output to the user and to allow the user to provide input to WD 10110. The type of interaction may vary depending on the type of user interface equipment 10132 installed in WD 10110. For example, if WD 10110 is a smart phone, the interaction may be via a touch screen; if WD 10110 is a smart meter, the interaction may be through a screen that provides usage (e.g., the number of gallons used) or a speaker that provides an audible alert (e.g., if smoke is detected). User interface equipment 10132 may include input interfaces, devices and circuits, and output interfaces, devices and circuits. User interface equipment 10132 is configured to allow input of information into WD 10110, and is connected to processing circuitry 10120 to allow processing circuitry 10120 to process the input information. User interface equipment 10132 may include, for example, a microphone, a proximity or other sensor, keys/buttons, a touch display, one or more cameras, a USB port, or other input circuitry. User interface equipment 10132 is also configured to allow output of information from WD 10110, and to allow processing circuitry 10120 to output information from WD 10110. User interface equipment 10132 may include, for example, a speaker, a display, vibrating circuitry, a USB port, a headphone interface, or other output circuitry. Using one or more input and output interfaces, devices, and circuits, of user interface equipment 10132, WD 10110 may communicate with end users and/or the wireless network, and allow them to benefit from the functionality described herein.

Auxiliary equipment 10134 is operable to provide more specific functionality which may not be generally performed by WDs. This may comprise specialized sensors for doing measurements for various purposes, interfaces for additional types of communication such as wired communications etc. The inclusion and type of components of auxiliary equipment 10134 may vary depending on the embodiment and/or scenario.

Power source 10136 may, in some embodiments, be in the form of a battery or battery pack. Other types of power sources, such as an external power source (e.g., an electricity outlet), photovoltaic devices or power cells, may also be used. WD 10110 may further comprise power circuitry 10137 for delivering power from power source 10136 to the various parts of WD 10110 which need power from power source 10136 to carry out any functionality described or indicated herein. Power circuitry 10137 may in certain embodiments comprise power management circuitry. Power circuitry 10137 may additionally or alternatively be operable to receive power from an external power source; in which case WD 10110 may be connectable to the external power source (such as an electricity outlet) via input circuitry or an interface such as an electrical power cable. Power circuitry 10137 may also in certain embodiments be operable to deliver power from an external power source to power source 10136. This may be, for example, for the charging of power source 10136. Power circuitry 10137 may perform any formatting, converting, or other modification to the power from power source 10136 to make the power suitable for the respective components of WD 10110 to which power is supplied.

Figure 10:
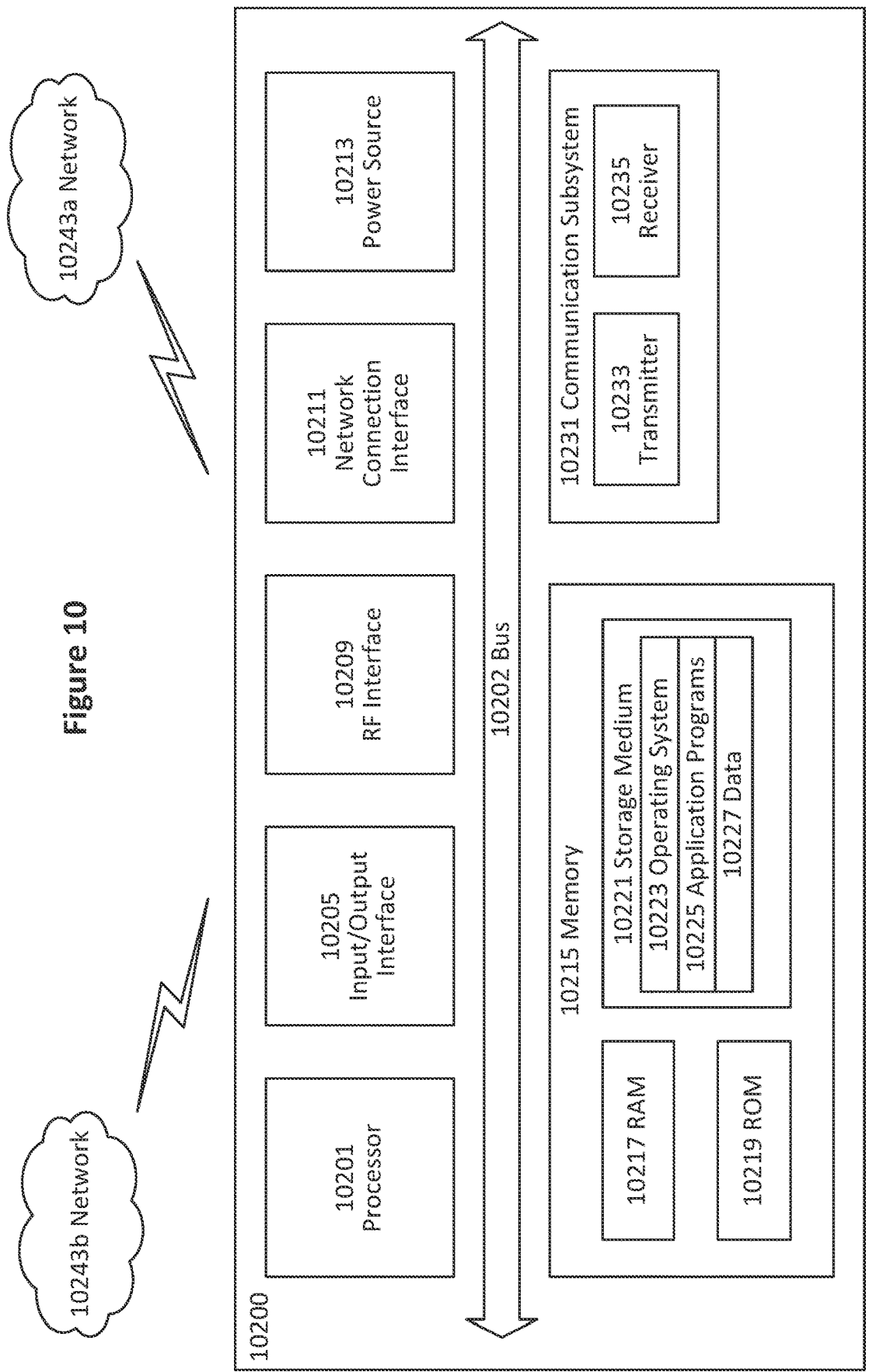
FIG. 10 is a block diagram of a user equipment in accordance with some embodiments

FIG. 10: User Equipment in Accordance with Some Embodiments

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 102200 may be any UE identified by the 3rd Generation Partnership Project (3GPP), including a NB-IoT UE, a machine type communication (MTC) UE, and/or an enhanced MTC (eMTC) UE. UE 10200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 10200 includes processing circuitry 10201 that is operatively coupled to input/output interface 10205, radio frequency (RF) interface 10209, network connection interface 10211, memory 10215 including random access memory (RAM) 10217, read-only memory (ROM) 10219, and storage medium 10221 or the like, communication subsystem 10231, power source 10233, and/or any other component, or any combination thereof. Storage medium 10221 includes operating system 10223, application program 10225, and data 10227. In other embodiments, storage medium 10221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 10201 may be configured to process computer instructions and data. Processing circuitry 10201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 10201 may include two central processing units (CPUs). Data may be information in a form suitable for use by a computer.

In the depicted embodiment, input/output interface 10205 may be configured to provide a communication interface to an input device, output device, or input and output device. UE 10200 may be configured to use an output device via input/output interface 10205. An output device may use the same type of interface port as an input device. For example, a USB port may be used to provide input to and output from UE 10200. The output device may be a speaker, a sound card, a video card, a display, a monitor, a printer, an actuator, an emitter, a smartcard, another output device, or any combination thereof. UE 10200 may be configured to use an input device via input/output interface 10205 to allow a user to capture information into UE 10200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 10209 may be configured to provide a communication interface to RF components such as a transmitter, a receiver, and an antenna. Network connection interface 10211 may be configured to provide a communication interface to network 10243a. Network 10243a may encompass wired and/or wireless networks such as a local-area network (LAN), a wide-area network (WAN), a computer network, a wireless network, a telecommunications network, another like network or any combination thereof. For example, network 10243a may comprise a Wi-Fi network. Network connection interface 10211 may be configured to include a receiver and a transmitter interface used to communicate with one or more other devices over a communication network according to one or more communication protocols, such as Ethernet, TCP/IP, SONET, ATM, or the like. Network connection interface 10211 may implement receiver and transmitter functionality appropriate to the communication network links (e.g., optical, electrical, and the like). The transmitter and receiver functions may share circuit components, software or firmware, or alternatively may be implemented separately.

RAM 10217 may be configured to interface via bus 10202 to processing circuitry 10201 to provide storage or caching of data or computer instructions during the execution of software programs such as the operating system, application programs, and device drivers. ROM 10219 may be configured to provide computer instructions or data to processing circuitry 10201. For example, ROM 10219 may be configured to store invariant low-level system code or data for basic system functions such as basic input and output (I/O), startup, or reception of keystrokes from a keyboard that are stored in a non-volatile memory. Storage medium 10221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 10221 may be configured to include operating system 10223, application program 10225 such as a web browser application, a widget or gadget engine or another application, and data file 10227. Storage medium 10221 may store, for use by UE 10200, any of a variety of various operating systems or combinations of operating systems.

Storage medium 10221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 10221 may allow UE 10200 to access computer-executable instructions, application programs or the like, stored on transitory or non-transitory memory media, to off-load data, or to upload data. An article of manufacture, such as one utilizing a communication system may be tangibly embodied in storage medium 10221, which may comprise a device readable medium.

In FIG. 10, processing circuitry 10201 may be configured to communicate with network 10243b using communication subsystem 10231. Network 10243a and network 10243b may be the same network or networks or different network or networks. Communication subsystem 10231 may be configured to include one or more transceivers used to communicate with network 10243b. For example, communication subsystem 10231 may be configured to include one or more transceivers used to communicate with one or more remote transceivers of another device capable of wireless communication such as another WD, UE, or base station of a radio access network (RAN) according to one or more communication protocols, such as IEEE 802.102, CDMA, WCDMA, GSM, LTE, UTRAN, WiMax, or the like. Each transceiver may include transmitter 10233 and/or receiver 10235 to implement transmitter or receiver functionality, respectively, appropriate to the RAN links (e.g., frequency allocations and the like). Further, transmitter 10233 and receiver 10235 of each transceiver may share circuit components, software or firmware, or alternatively may be implemented separately.

In the illustrated embodiment, the communication functions of communication subsystem 10231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 10231 may include cellular communication, Wi-Fi communication, Bluetooth communication, and GPS communication. Network 10243*b* may encompass wired and/or wireless networks such as a local-area network (LAN), a wide-area network (WAN), a computer network, a wireless network, a telecommunications network, another like network or any combination thereof. For example, network 10243*b* may be a cellular network, a Wi-Fi network, and/or a near-field network. Power source 10213 may be configured to provide alternating current (AC) or direct current (DC) power to components of UE 10200.

The features, benefits and/or functions described herein may be implemented in one of the components of UE 10200 or partitioned across multiple components of UE 10200. Further, the features, benefits, and/or functions described herein may be implemented in any combination of hardware, software or firmware. In one example, communication subsystem 10231 may be configured to include any of the components described herein. Further, processing circuitry 10201 may be configured to communicate with any of such components over bus 10202. In another example, any of such components may be represented by program instructions stored in memory that when executed by processing circuitry 10201 perform the corresponding functions described herein. In another example, the functionality of any of such components may be partitioned between processing circuitry 10201 and communication subsystem 10231. In another example, the non-computationally intensive functions of any of such components may be implemented in software or firmware and the computationally intensive functions may be implemented in hardware.

Figure 11:
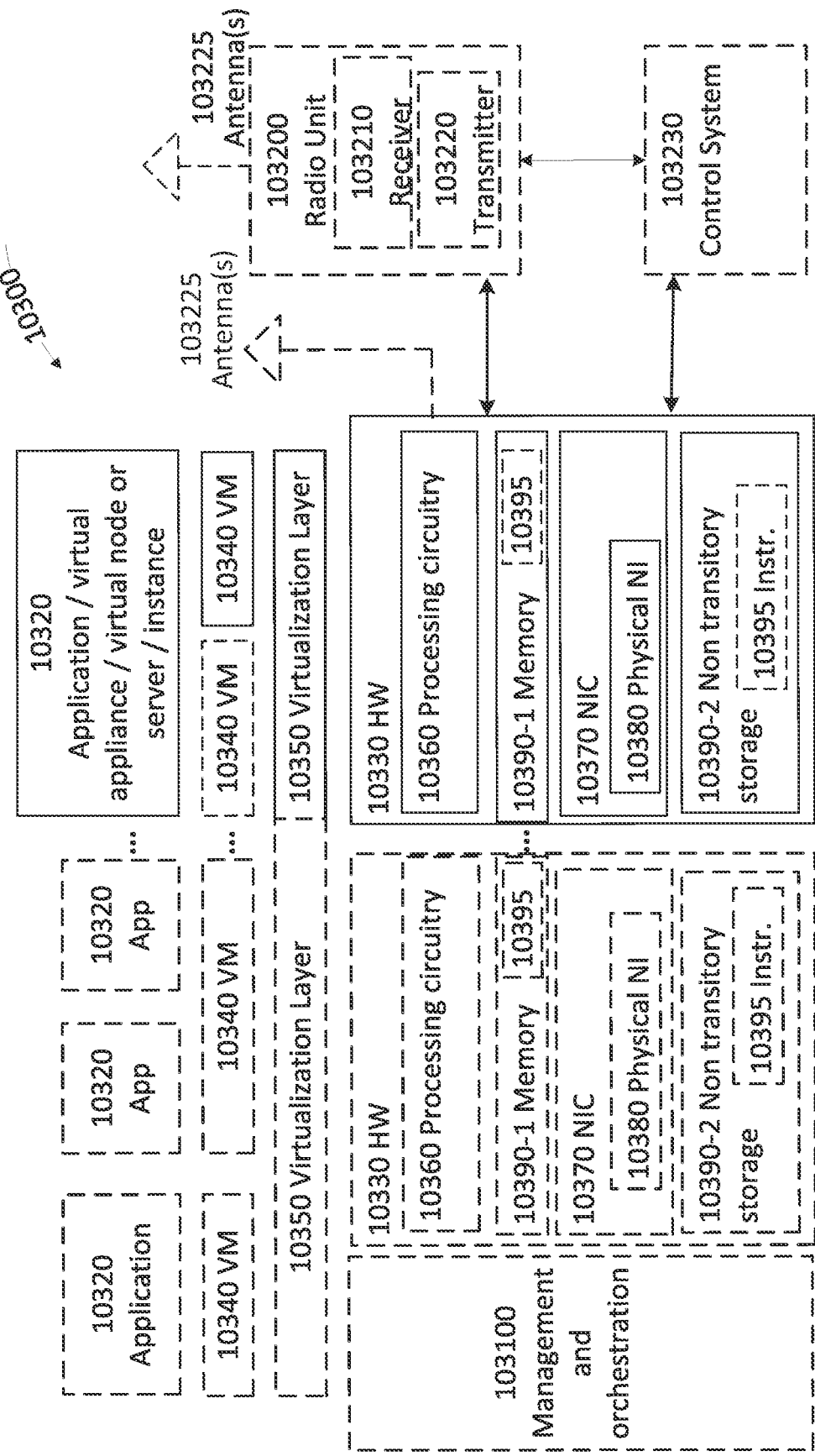
FIG. 11 is a block diagram of a virtualization environment in accordance with some embodiments.

FIG. 11: Virtualization Environment in Accordance with Some Embodiments

FIG. 11 is a schematic block diagram illustrating a virtualization environment 10300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 10300 hosted by one or more of hardware nodes 10330. Further, in embodiments in which the virtual node is not a radio access node or does not require radio connectivity (e.g., a core network node), then the network node may be entirely virtualized.

The functions may be implemented by one or more applications 10320 (which may alternatively be called software instances, virtual appliances, network functions, virtual nodes, virtual network functions, etc.) operative to implement some of the features, functions, and/or benefits of some of the embodiments disclosed herein. Applications 10320 are run in virtualization environment 10300 which provides hardware 10330 comprising processing circuitry 10360 and memory 10390. Memory 10390 contains instructions 10395 executable by processing circuitry 10360 whereby application 10320 is operative to provide one or more of the features, benefits, and/or functions disclosed herein.

Virtualization environment 10300, comprises general-purpose or special-purpose network hardware devices 10330 comprising a set of one or more processors or processing circuitry 10360, which may be commercial off-the-shelf (COTS) processors, dedicated Application Specific Integrated Circuits (ASICs), or any other type of processing circuitry including digital or analog hardware components or special purpose processors. Each hardware device may comprise memory 10390-1 which may be non-persistent memory for temporarily storing instructions 10395 or software executed by processing circuitry 10360. Each hardware device may comprise one or more network interface controllers (NICs) 10370, also known as network interface cards, which include physical network interface 10380. Each hardware device may also include non-transitory, persistent, machine-readable storage media 10390-2 having stored therein software 10395 and/or instructions executable by processing circuitry 10360. Software 10395 may include any type of software including software for instantiating one or more virtualization layers 10350 (also referred to as hypervisors), software to execute virtual machines 10340 as well as software allowing it to execute functions, features and/or benefits described in relation with some embodiments described herein.

Virtual machines 10340, comprise virtual processing, virtual memory, virtual networking or interface and virtual storage, and may be run by a corresponding virtualization layer 10350 or hypervisor. Different embodiments of the instance of virtual appliance 10320 may be implemented on one or more of virtual machines 10340, and the implementations may be made in different ways.

During operation, processing circuitry 10360 executes software 10395 to instantiate the hypervisor or virtualization layer 10350, which may sometimes be referred to as a virtual machine monitor (VMM). Virtualization layer 10350 may present a virtual operating platform that appears like networking hardware to virtual machine 10340.

As shown in FIG. 11, hardware 10330 may be a stand-alone network node with generic or specific components. Hardware 10330 may comprise antenna 103225 and may implement some functions via virtualization. Alternatively, hardware 10330 may be part of a larger cluster of hardware (e.g. such as in a data center or customer premise equipment (CPE)) where many hardware nodes work together and are managed via management and orchestration (MANO) 103100, which, among others, oversees lifecycle management of applications 10320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 10340 may be a software implementation of a physical machine that runs programs as if they were executing on a physical, non-virtualized machine. Each of virtual machines 10340, and that part of hardware 10330 that executes that virtual machine, be it hardware dedicated to that virtual machine and/or hardware shared by that virtual machine with others of the virtual machines 10340, forms a separate virtual network elements (VNE).

Still in the context of NFV, Virtual Network Function (VNF) is responsible for handling specific network functions that run in one or more virtual machines 10340 on top of hardware networking infrastructure 10330 and corresponds to application 10320 in FIG. 11.

In some embodiments, one or more radio units 103200 that each include one or more transmitters 103220 and one or more receivers 103210 may be coupled to one or more antennas 103225. Radio units 103200 may communicate directly with hardware nodes 10330 via one or more appropriate network interfaces and may be used in combination with the virtual components to provide a virtual node with radio capabilities, such as a radio access node or a base station.

In some embodiments, some signalling can be effected with the use of control system 103230 which may alternatively be used for communication between the hardware nodes 10330 and radio units 103200.

Figure 12:
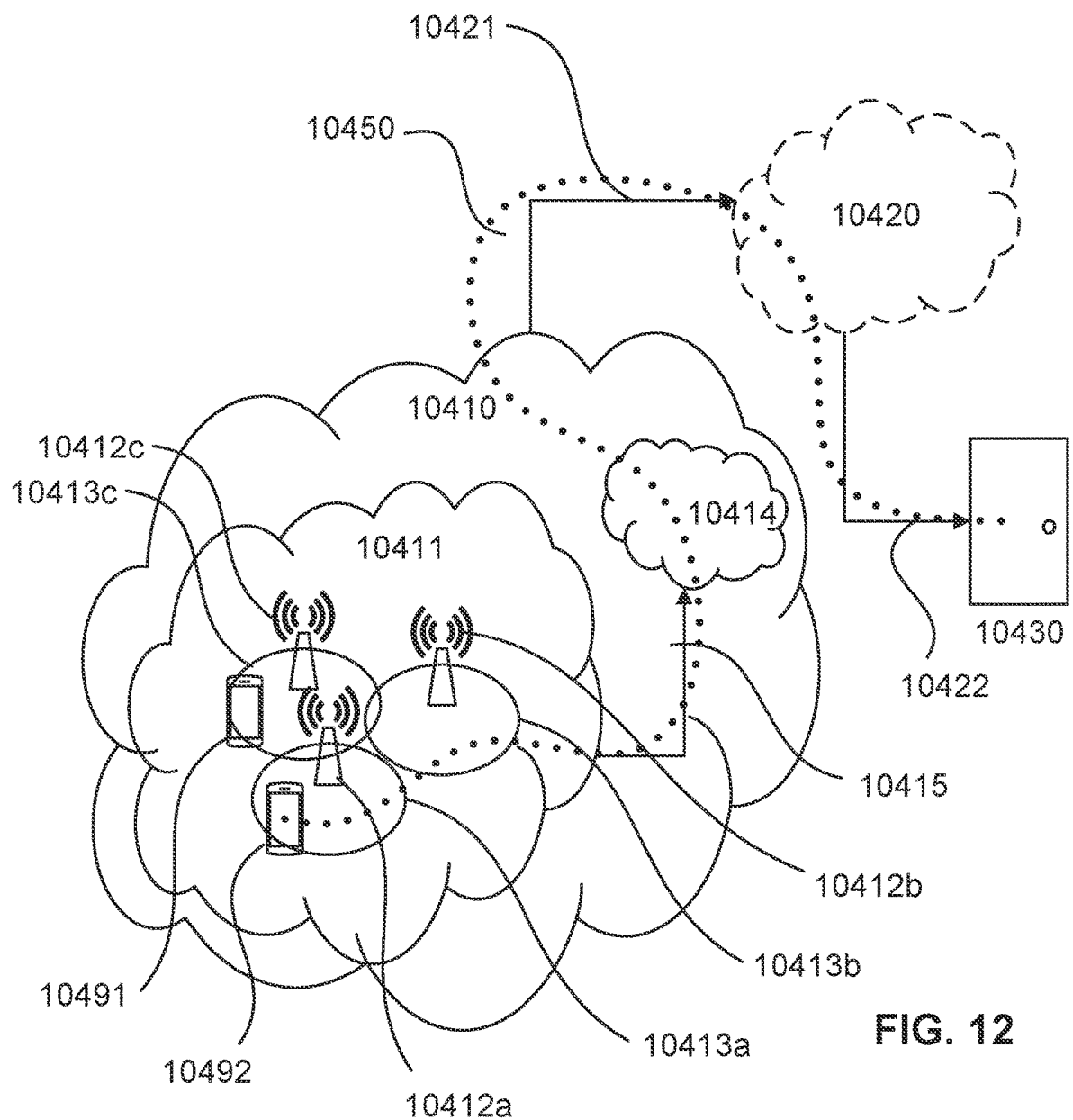
FIG. 12 is a block diagram of a telecommunication network connected via an intermediate network to a host computer in accordance with some embodiments.

FIG. 12: Telecommunication Network Connected Via an Intermediate Network to a Host Computer in Accordance with Some Embodiments With reference to FIG. 12, in accordance with an embodiment, a communication system includes telecommunication network 10410, such as a 3GPP-type cellular network, which comprises access network 10411, such as a radio access network, and core network 10414. Access network 10411 comprises a plurality of base stations 10412a, 10412b, 10412c, such as NBs, eNBs, gNBs or other types of wireless access points, each defining a corresponding coverage area 10413a, 10413b, 10413c. Each base station 10412a, 10412b, 10412c is connectable to core network 10414 over a wired or wireless connection 10415. A first UE 10491 located in coverage area 10413c is configured to wirelessly connect to, or be paged by, the corresponding base station 10412c. A second UE 10492 in coverage area 10413a is wirelessly connectable to the corresponding base station 10412a. While a plurality of UEs 10491, 10492 are illustrated in this example, the disclosed embodiments are equally applicable to a situation where a sole UE is in the coverage area or where a sole UE is connecting to the corresponding base station 10412.

Telecommunication network 10410 is itself connected to host computer 10430, which may be embodied in the hardware and/or software of a standalone server, a cloud-implemented server, a distributed server or as processing resources in a server farm. Host computer 10430 may be under the ownership or control of a service provider, or may be operated by the service provider or on behalf of the service provider. Connections 10421 and 10422 between telecommunication network 10410 and host computer 10430 may extend directly from core network 10414 to host computer 10430 or may go via an optional intermediate network 10420. Intermediate network 10420 may be one of, or a combination of more than one of, a public, private or hosted network; intermediate network 10420, if any, may be a backbone network or the Internet; in particular, intermediate network 10420 may comprise two or more sub-networks (not shown).

The communication system of FIG. 12 as a whole enables connectivity between the connected UEs 10491, 10492 and host computer 10430. The connectivity may be described as an over-the-top (OTT) connection 10450. Host computer 10430 and the connected UEs 10491, 10492 are configured to communicate data and/or signaling via OTT connection 10450, using access network 10411, core network 10414, any intermediate network 10420 and possible further infrastructure (not shown) as intermediaries. OTT connection 10450 may be transparent in the sense that the participating communication devices through which OTT connection 10450 passes are unaware of routing of uplink and downlink communications. For example, base station 10412 may not or need not be informed about the past routing of an incoming downlink communication with data originating from host computer 10430 to be forwarded (e.g., handed over) to a connected UE 10491. Similarly, base station 10412 need not be aware of the future routing of an outgoing uplink communication originating from the UE 10491 towards the host computer 10430.

Figure 13:
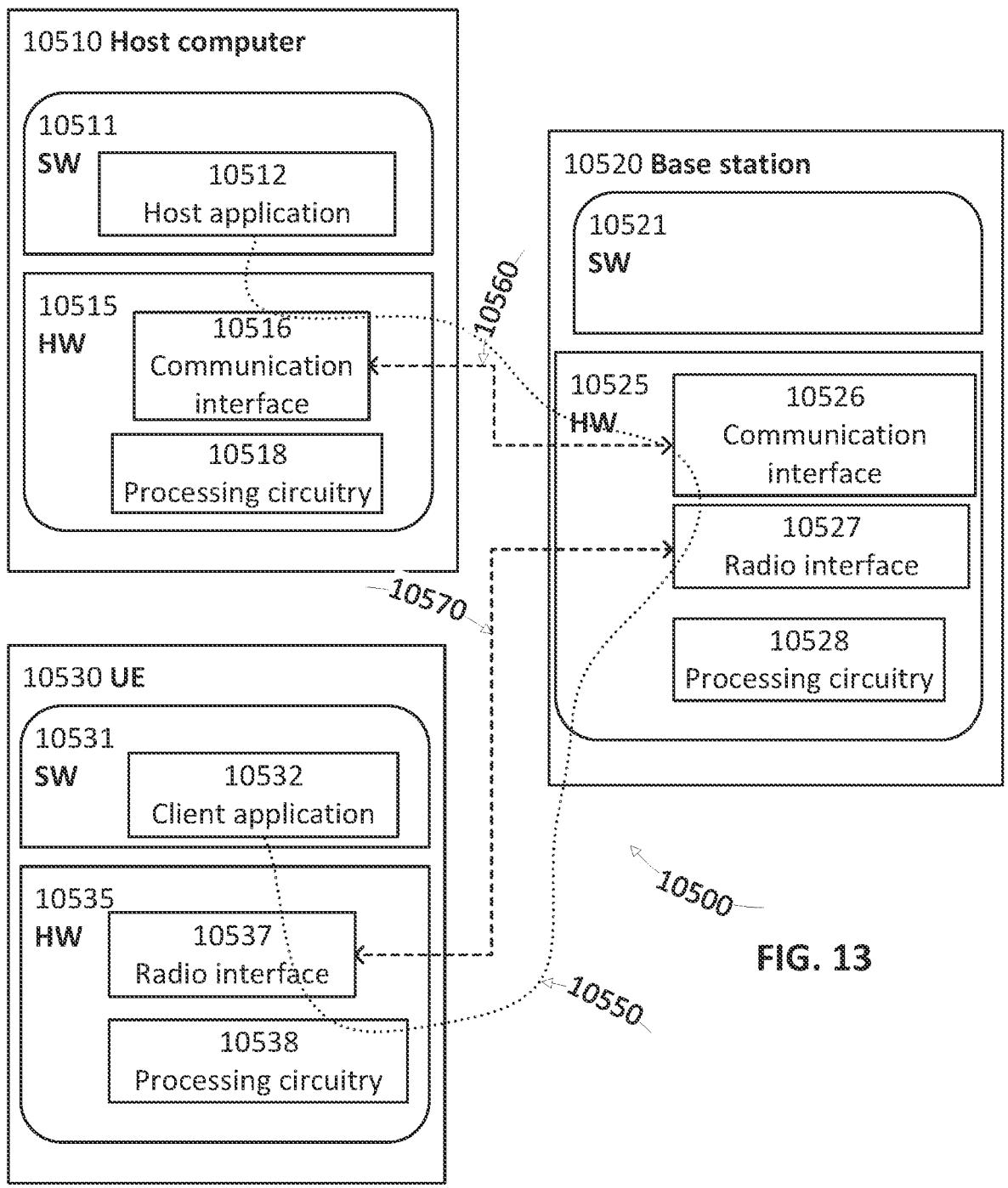
FIG. 13 is a block diagram of a host computer communicating via a base station with a user equipment over a partially wireless connection in accordance with some embodiments.

FIG. 13: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 13. In communication system 10500, host computer 10510 comprises hardware 10515 including communication interface 10516 configured to set up and maintain a wired or wireless connection with an interface of a different communication device of communication system 10500. Host computer 10510 further comprises processing circuitry 10518, which may have storage and/or processing capabilities. In particular, processing circuitry 10518 may comprise one or more programmable processors, application-specific integrated circuits, field programmable gate arrays or combinations of these (not shown) adapted to execute instructions. Host computer 10510 further comprises software 10511, which is stored in or accessible by host computer 10510 and executable by processing circuitry 10518. Software 10511 includes host application 10512. Host application 10512 may be operable to provide a service to a remote user, such as UE 10530 connecting via OTT connection 10550 terminating at UE 10530 and host computer 10510. In providing the service to the remote user, host application 10512 may provide user data which is transmitted using OTT connection 10550.

Communication system 10500 further includes base station 10520 provided in a telecommunication system and comprising hardware 10525 enabling it to communicate with host computer 10510 and with UE 10530. Hardware 10525 may include communication interface 10526 for setting up and maintaining a wired or wireless connection with an interface of a different communication device of communication system 10500, as well as radio interface 10527 for setting up and maintaining at least wireless connection 10570 with UE 10530 located in a coverage area (not shown in FIG. 13) served by base station 10520.

Communication interface 10526 may be configured to facilitate connection 10560 to host computer 10510. Connection 10560 may be direct or it may pass through a core network (not shown in FIG. 13) of the telecommunication system and/or through one or more intermediate networks outside the telecommunication system. In the embodiment shown, hardware 10525 of base station 10520 further includes processing circuitry 10528, which may comprise one or more programmable processors, application-specific integrated circuits, field programmable gate arrays or combinations of these (not shown) adapted to execute instructions. Base station 10520 further has software 10521 stored internally or accessible via an external connection.

Communication system 10500 further includes UE 10530 already referred to. Its hardware 10535 may include radio interface 10537 configured to set up and maintain wireless connection 10570 with a base station serving a coverage area in which UE 10530 is currently located. Hardware 10535 of UE 10530 further includes processing circuitry 10538, which may comprise one or more programmable processors, application-specific integrated circuits, field programmable gate arrays or combinations of these (not shown) adapted to execute instructions. UE 10530 further comprises software 10531, which is stored in or accessible by UE 10530 and executable by processing circuitry 10538. Software 10531 includes client application 10532. Client application 10532 may be operable to provide a service to a human or non-human user via UE 10530, with the support of host computer 10510. In host computer 10510, an executing host application 10512 may communicate with the executing client application 10532 via OTT connection 10550 terminating at UE 10530 and host computer 10510. In providing the service to the user, client application 10532 may receive request data from host application 10512 and provide user data in response to the request data. OTT connection 10550 may transfer both the request data and the user data. Client application 10532 may interact with the user to generate the user data that it provides.

It is noted that host computer 10510, base station 10520 and UE 10530 illustrated in FIG. 13 may be similar or identical to host computer 10430, one of base stations 10412*a*, 10412*b*, 10412*c* and one of UEs 10491, 10492 of FIG. 12, respectively. This is to say, the inner workings of these entities may be as shown in FIG. 13 and independently, the surrounding network topology may be that of FIG. 12.

In FIG. 13, OTT connection 10550 has been drawn abstractly to illustrate the communication between host computer 10510 and UE 10530 via base station 10520, without explicit reference to any intermediary devices and the precise routing of messages via these devices. Network infrastructure may determine the routing, which it may be configured to hide from UE 10530 or from the service provider operating host computer 10510, or both. While OTT connection 10550 is active, the network infrastructure may further take decisions by which it dynamically changes the routing (e.g., on the basis of load balancing consideration or reconfiguration of the network).

Wireless connection 10570 between UE 10530 and base station 10520 is in accordance with the teachings of the embodiments described throughout this disclosure. One or more of the various embodiments may improve the performance of OTT services provided to UE 10530 using OTT connection 10550, in which wireless connection 10570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 10550 between host computer 10510 and UE 10530, in response to variations in the measurement results. The measurement procedure and/or the network functionality for reconfiguring OTT connection 10550 may be implemented in software 10511 and hardware 10515 of host computer 10510 or in software 10531 and hardware 10535 of UE 10530, or both. In embodiments, sensors (not shown) may be deployed in or in association with communication devices through which OTT connection 10550 passes; the sensors may participate in the measurement procedure by supplying values of the monitored quantities exemplified above, or supplying values of other physical quantities from which software 10511, 10531 may compute or estimate the monitored quantities. The reconfiguring of OTT connection 10550 may include message format, retransmission settings, preferred routing etc.; the reconfiguring need not affect base station 10520, and it may be unknown or imperceptible to base station 10520. Such procedures and functionalities may be known and practiced in the art. In certain embodiments, measurements may involve proprietary UE signaling facilitating host computer 10510's measurements of throughput, propagation times, latency and the like. The measurements may be implemented in that software 10511 and 10531 causes messages to be transmitted, in particular empty or 'dummy' messages, using OTT connection 10550 while it monitors propagation times, errors etc.

Figure 14:
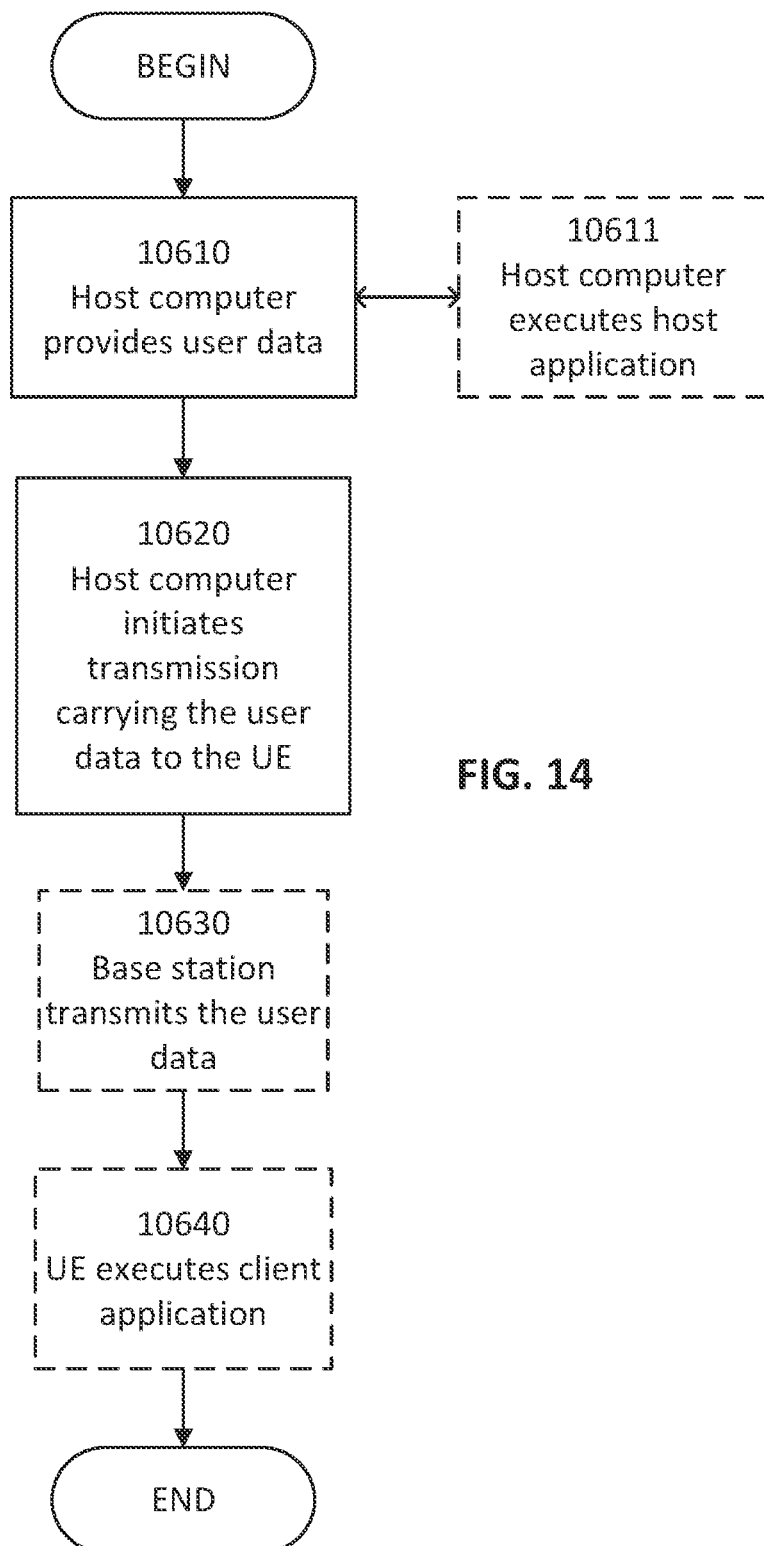
FIG. 14 is a block diagram of methods implemented in a communication system including a host computer, a base station and a user equipment in accordance with some embodiments.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 10610, the host computer provides user data. In substep 10611 (which may be optional) of step 10610, the host computer provides the user data by executing a host application. In step 10620, the host computer initiates a transmission carrying the user data to the UE. In step 10630 (which may be optional), the base station transmits to the UE the user data which was carried in the transmission that the host computer initiated, in accordance with the teachings of the embodiments described throughout this disclosure. In step 10640 (which may also be optional), the UE executes a client application associated with the host application executed by the host computer.

Figure 15:
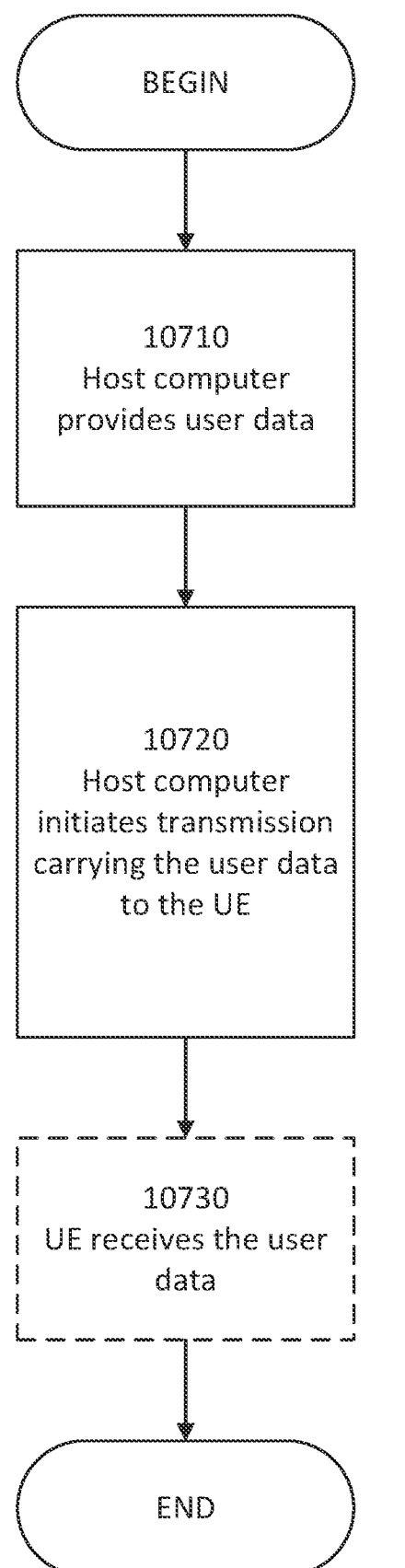
FIG. 15 is a block diagram of methods implemented in a communication system including a host computer, a base station and a user equipment in accordance with some embodiments.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 10710 of the method, the host computer provides user data. In an optional substep (not shown) the host computer provides the user data by executing a host application. In step 10720, the host computer initiates a transmission carrying the user data to the UE. The transmission may pass via the base station, in accordance with the teachings of the embodiments described throughout this disclosure. In step 10730 (which may be optional), the UE receives the user data carried in the transmission.

Figure 16:
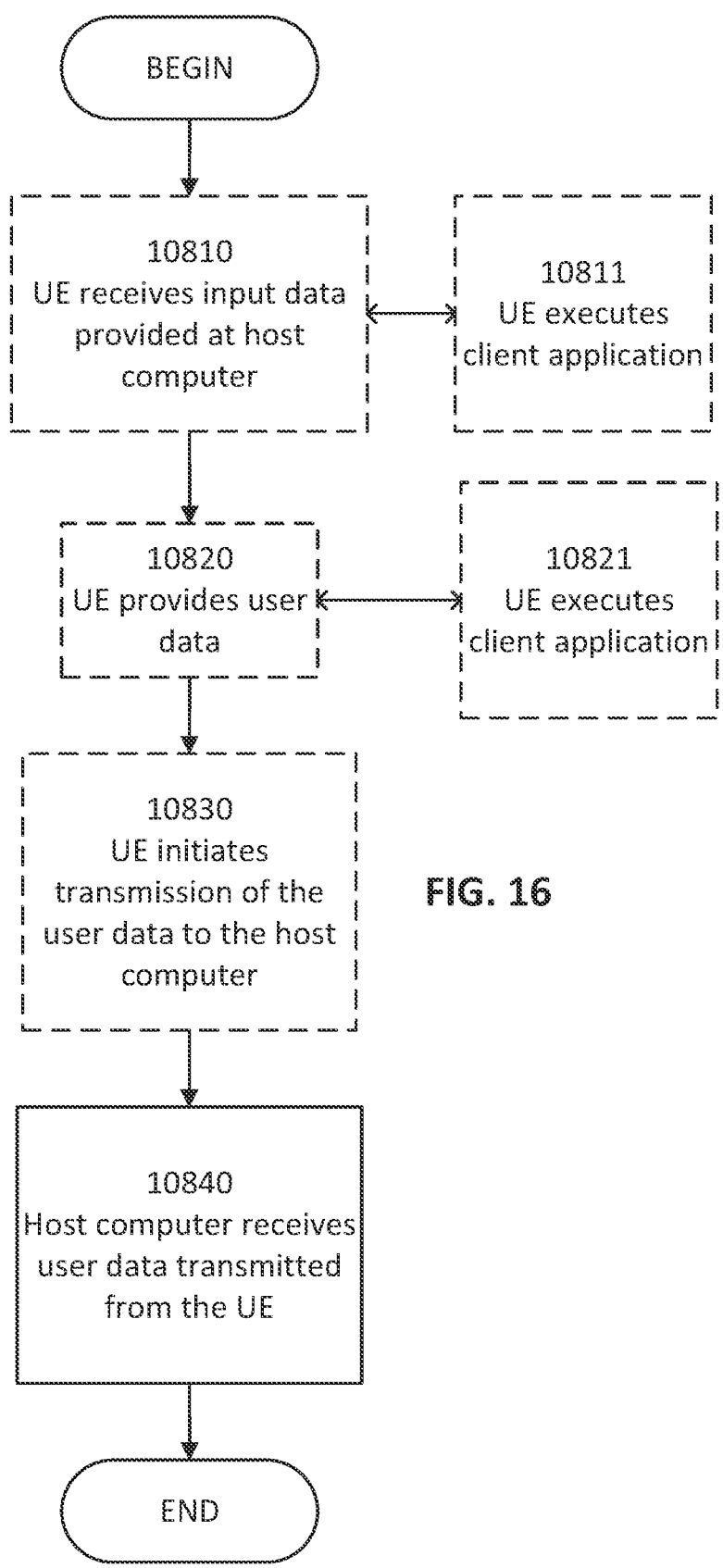
FIG. 16 is a block diagram of methods implemented in a communication system including a host computer, a base station and a user equipment in accordance with some embodiments.

FIG. 16: Methods Implemented in a Communication System Including a Host Computer, a Base Station and a User Equipment In Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 10810 (which may be optional), the UE receives input data provided by the host computer. Additionally or alternatively, in step 10820, the UE provides user data. In substep 10821 (which may be optional) of step 10820, the UE provides the user data by executing a client application. In substep 10811 (which may be optional) of step 10810, the UE executes a client application which provides the user data in reaction to the received input data provided by the host computer. In providing the user data, the executed client application may further consider user input received from the user. Regardless of the specific manner in which the user data was provided, the UE initiates, in substep 10830 (which may be optional), transmission of the user data to the host computer. In step 10840 of the method, the host computer receives the user data transmitted from the UE, in accordance with the teachings of the embodiments described throughout this disclosure.

Figure 17:
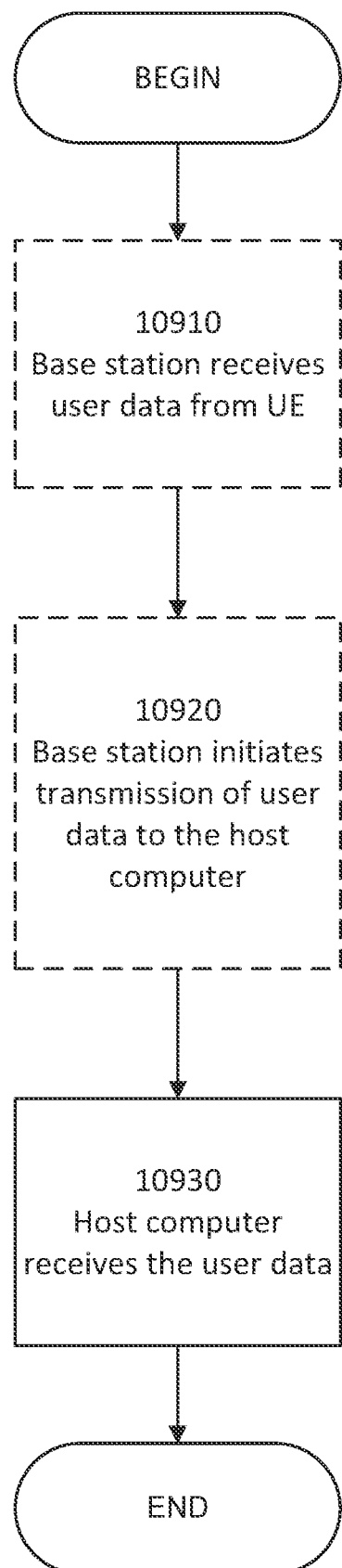
FIG. 17 is a block diagram of methods implemented in a communication system including a host computer, a base station and a user equipment in accordance with some embodiments.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 10910 (which may be optional), in accordance with the teachings of the embodiments described throughout this disclosure, the base station receives user data from the UE. In step 10920 (which may be optional), the base station initiates transmission of the received user data to the host computer. In step 10930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the claims and their equivalents, and shall not be restricted or limited by the foregoing detailed description.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

AMF Access and Mobility Management Function
AS Access Stratum
CN Core Network
CP Control Plane
DRB Data Bearers or Data Radio Bearers
eNB Evolved NodeB
gNB Next Generation NodeB
IMS IP Multimedia Subsystem
IP Internet Protocol
LMS Limited Service Mode
LTE Long Term Evolution
NAS Non-Access Stratum
NG Next Generation
PDU Protocol Data Unit
RAN Radio Access Network
RRC Radio Resource Control
SEAF SEcurity Anchor Function
SMC Security Mode Command
SMF Session Management Function
SRB Signaling Data Bearer or Signaling Radio Bearer
UE User Equipment
UP User Plane
UPF User Plane Function
4G $4^{th}$ Generation
5G $5^{th}$ Generation
References are identified below.

[1] 3GPP TS 33.501 V15.3.1 (2018 December), Technical Specification Group Services and System Aspects; Security architecture and procedures for 5G system (Release 15)

[2] 3GPP TS 23.501 V15.4.0 (2018 December), Technical Specification Group Services and System Aspects; System Architecture for the 5G System; Stage 2 (Release 15)

The invention claimed is:

1. A method of operating a core network node in a wireless communication system to determine user plane security activation, wherein the core network node comprises a Session Management Function, SMF, node, the method comprising:

obtaining a user plane session establishment request for a wireless device, wherein the obtaining comprises the SMF node receiving the request from an Access and Mobility Management Function, AMF, node;

obtaining an indication, comprising receiving the indication from the AMF node, that the user plane session establishment request for the wireless device is associated with an emergency session and/or that null ciphering and/or null integrity protection are applied to a control plane associated with a control plane session for the wireless device;

determining that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session; and providing a user plane security policy to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

2. The method of claim 1, wherein the user plane session establishment request includes the indication that the user plane session establishment request is associated with the emergency session and/or that null ciphering and/or null integrity protection are applied to the control plane associated with the control plane session.

3. The method of claim 1, wherein the user plane security policy comprises an indication to not activate integrity and/or confidentiality protection of the user plane for the wireless device.

4. The method of claim 1, wherein the indication is provided by the wireless device.

5. The method of claim 1, wherein the wireless device is operating in a Limited Service Mode, LSM.

6. The method of claim 1, where the user plane session establishment request is a request for an un-authenticated emergency session.

7. The method of claim 1, wherein the control plane session is associated with the user plane session and/or wherein the control plane session is associated with the emergency session.

8. A core network, CN, node, comprising a Session Management Function, SMF, node configured to operate in a wireless communication network, wherein the CN node is adapted to:

obtain a user plane session establishment request for a wireless device, comprising the SMF node receiving the user plane session establishment request from an Access and Mobility Management Function, AMF, node;

obtain an indication, comprising receiving the indication from the AMF node, that the user plane session establishment request for the wireless device is associated with an emergency session and/or that null ciphering and/or null integrity protection are applied to a control plane associated with a control plane session for the wireless device;

determine that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session; and provide a user plane security policy to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

9. The CN node of claim 8, wherein the user plane session establishment request includes the indication that the user plane session establishment request is associated with the emergency session and/or that null ciphering and/or null integrity protection are applied to the control plane associated with the control plane session.

10. The CN node of claim 8, wherein the user plane security policy comprises an indication to not activate integrity and/or confidentiality protection of the user plane for the wireless device.

11. The CN node of claim 8, wherein the indication is provided by the wireless device.

12. The CN node of claim 8, wherein the wireless device is operating in a Limited Service Mode, LSM.

13. The CN node of claim 8, where the user plane session establishment request is a request for an un-authenticated emergency session.

14. The CN node of claim 8, wherein the control plane session is associated with the user plane session and/or wherein the control plane session is associated with the emergency session.

15. A core network, CN, node, comprising a Session Management Function, SMF, node configured to operate in a communication network, the CN node comprising:

processing circuitry; and memory coupled with the processing circuitry, wherein the memory includes instructions that when executed by the processing circuitry causes the CN node to, obtain a user plane session establishment request for a wireless device, comprising the SMF node receiving the user plane session establishment request from an Access and Mobility Management Function, AMF, node, obtain an indication, comprising receiving the indication from the AMF node, that the user plane session establishment request for the wireless device is associated with an emergency session and/or that null ciphering and/or null integrity protection are applied to a control plane associated with a control plane session for the wireless device, determine that a user plane should be configured for the user plane session for the wireless device without activating integrity and/or confidentiality protection for the user plane based on the indication that the user plane session establishment request for the wireless device is associated with an emergency session and/or that null ciphering and/or null integrity protection are applied to the control plane associated with the control plane session, and provide a user plane security policy to a radio access network, RAN, node associated with the wireless device, wherein the user plane security policy indicates to configure the user plane for the user plane session for the wireless device without activating integrity and/or confidentiality protection based on determining that a user plane should be configured for the user plane session for the wireless device without activating integrity and/or confidentiality protection.

16. The CN node of claim 15, wherein the user plane session establishment request includes the indication that the user plane session establishment request is associated with the emergency session and/or that null ciphering and/or null integrity protection are applied to the control plane associated with the control plane session.

17. The CN node of claim 15, wherein the user plane security policy comprises an indication to not activate integrity and/or confidentiality protection of the user plane for the wireless device.

18. The CN node of claim 15, wherein the indication is provided by the wireless device.

19. The CN node of claim 15, wherein the wireless device is operating in a Limited Service Mode, LSM.

20. The CN node of claim 15, where the user plane session establishment request is a request for an un-authenticated emergency session.

21. The CN node of claim 15, wherein the control plane session is associated with the user plane session and/or wherein the control plane session is associated with the emergency session.

\* \* \* \* \*